(12) United States Patent
Kelada

(10) Patent No.: US 8,852,432 B2
(45) Date of Patent: Oct. 7, 2014

(54) INDUCED SYMBIOTIC OSMOSIS [ISO] FOR SEAWATER DESLINATION AND PUMPING TO HIGH ALTITUDE

(71) Applicant: Maher Isaac Kelada, Houston, TX (US)

(72) Inventor: Maher Isaac Kelada, Houston, TX (US)

(*) Notice: Subject to any disclaimer, the term of this patent is extended or adjusted under 35 U.S.C. 154(b) by 0 days.

(21) Appl. No.: 13/974,520

(22) Filed: Aug. 23, 2013

(65) Prior Publication Data
US 2014/0251909 A1 Sep. 11, 2014

Related U.S. Application Data

(62) Division of application No. 12/543,264, filed on Aug. 18, 2009, now Pat. No. 8,545,701.

(51) Int. Cl.
| | |
|---|---|
| *B01D 61/06* | (2006.01) |
| *B01D 61/58* | (2006.01) |
| *B01D 61/08* | (2006.01) |
| *C02F 1/44* | (2006.01) |
| *F03G 7/00* | (2006.01) |
| *F04B 17/02* | (2006.01) |

(52) U.S. Cl.
CPC ............... *C02F 1/441* (2013.01); *B01D 61/06* (2013.01)
USPC ...................... 210/257.2; 210/258; 210/195.2; 210/170.01; 210/321.66; 210/641; 210/652; 210/805; 210/321.72; 417/303; 417/411

(58) Field of Classification Search
CPC ....... Y02E 10/22; Y02E 10/226; Y02E 10/36; F04B 17/02; F03G 7/00; F03G 7/005; B01D 61/06; B01D 61/022; B01D 61/04; B01D 61/002; B01D 61/58; B01D 2313/246; B01D 2313/243; B01D 2313/36; B01D 2313/365; B01D 2313/50; B01D 2317/02; B01D 2317/022; B01D 2317/025; B01D 2317/027; B01D 2317/08; B01D 2311/25; C02F 1/441; C02F 1/445; C02F 9/00; C02F 2103/08; C02F 2201/009; C02F 2301/046
USPC ...................... 290/1 R, 54, 55; 417/411, 313; 405/195.1, 224.2, 75; 210/195.1, 210/195.2, 255, 257.1, 257.2, 258, 260, 210/262, 641, 644, 649–652, 805, 321.66, 210/321.72, 167.01, 167.31, 170.01, 210/170.07, 170.09, 170.1, 170.11
See application file for complete search history.

(56) References Cited

U.S. PATENT DOCUMENTS

| | | |
|---|---|---|
| 3,133,132 A | 5/1964 | Loeb |
| 3,423,491 A | 1/1969 | McLain |

(Continued)

FOREIGN PATENT DOCUMENTS

WO 2008/060435 5/2008

OTHER PUBLICATIONS

Kelada, Maher I., "Hollow Fiber Apparatus and Methods of Using Same to Harness Salinity Osmotic Potential in Large Power Generation, Desalination and Extraction Plants," U.S. Appl. No. 61/765,268 mailed Feb. 15, 2013. [76 pages].

(Continued)

*Primary Examiner* — David C Mellon
(74) *Attorney, Agent, or Firm* — The Morris Law Firm, P.C.; Paula Morris

(57) ABSTRACT

An induced symbiotic osmosis pump (ISOP) (and method of using same) comprising: a closed loop comprising a riser pipe and a downpipe having substantially the same length fluidly communicating at a base with an induced osmosis semipermeable membrane and fluidly communicating at an opposed end with a brine pump fluidly communicating with a pressure exchanger fluidly communicating with a reverse osmosis membrane, the downpipe comprising a check valve; the induced osmosis semipermeable membrane of the closed loop fluidly communicating with an initial reverse osmosis module fluidly communicating with a brine pump fluidly communicating with a source of fluid having an initial salinity; the brine pump electronically communicating with an electrical source; and, the reverse osmosis membrane fluidly communicating with a storage tank.

6 Claims, 26 Drawing Sheets

(56) References Cited

U.S. PATENT DOCUMENTS

| | | | |
|---|---|---|---|
| 3,674,628 A | 7/1972 | Fabre | |
| 3,906,250 A | 9/1975 | Loeb | |
| 3,978,344 A | 8/1976 | Jellinek | |
| 4,056,467 A | 11/1977 | Christen | |
| 4,115,492 A | 9/1978 | Mahoney | |
| 4,193,267 A | 3/1980 | Loeb | |
| 4,209,307 A | 6/1980 | Leonard | |
| 4,219,517 A | 8/1980 | Kesting | |
| 4,283,913 A | 8/1981 | Loeb | |
| 4,340,481 A | 7/1982 | Mishiro | |
| 4,364,759 A | 12/1982 | Brooks | |
| 4,512,894 A | 4/1985 | Wang | |
| 4,574,049 A * | 3/1986 | Pittner | 210/639 |
| 4,769,146 A | 9/1988 | Schmidt | |
| 5,137,631 A | 8/1992 | Eckman | |
| 5,192,478 A | 3/1993 | Caskey | |
| 5,230,796 A | 7/1993 | Meulen | |
| 5,306,428 A | 4/1994 | Tonner | |
| 5,380,433 A | 1/1995 | Etienne | |
| 5,762,798 A | 6/1998 | Wenthold | |
| 5,888,400 A | 3/1999 | Tholema | |
| 6,001,262 A | 12/1999 | Kelada | |
| 6,126,815 A | 10/2000 | Kelada | |
| 6,185,940 B1 | 2/2001 | Prueitt | |
| 6,245,228 B1 | 6/2001 | Kelada | |
| 6,313,545 B1 | 11/2001 | Finley et al. | |
| 6,354,444 B1 | 3/2002 | Mahendran | |
| 6,559,554 B2 | 5/2003 | Finley et al. | |
| 6,783,008 B2 | 8/2004 | Zha | |
| 7,300,582 B2 | 11/2007 | Pedersen | |
| 7,303,674 B2 | 12/2007 | Lampi et al. | |
| 7,329,962 B2 | 2/2008 | Alstot et al. | |
| 7,391,126 B2 * | 6/2008 | Liu et al. | 290/44 |
| 7,727,393 B2 | 6/2010 | Lee | |
| 7,862,719 B2 | 1/2011 | McMahon | |
| 8,029,671 B2 | 10/2011 | Cath et al. | |
| 8,075,776 B2 | 12/2011 | Mahendran | |
| 8,099,958 B2 | 1/2012 | Al-Mayahi et al. | |
| 8,123,948 B2 | 2/2012 | Jensen | |
| 8,540,081 B2 | 9/2013 | Jerman et al. | |
| 8,545,701 B2 | 10/2013 | Kelada | |
| 2003/0164613 A1 | 9/2003 | Finley et al. | |
| 2005/0133441 A1 | 6/2005 | Charkoudian | |
| 2006/0151375 A1 | 7/2006 | Mauri | |
| 2007/0068871 A1 * | 3/2007 | Flynn | 210/649 |
| 2007/0181473 A1 * | 8/2007 | Manth et al. | 210/137 |
| 2007/0246422 A1 | 10/2007 | Schafer | |
| 2008/0169723 A1 | 7/2008 | Thorsen et al. | |
| 2008/0190848 A1 | 8/2008 | Oklejas | |
| 2008/0230376 A1 | 9/2008 | Brauns | |
| 2009/0173673 A1 | 7/2009 | Prichard | |
| 2010/0032377 A1 | 2/2010 | Wohlert | |
| 2010/0183903 A1 | 7/2010 | McGinnis et al. | |
| 2010/0192575 A1 * | 8/2010 | Al-Mayahi et al. | 60/671 |
| 2011/0044824 A1 | 2/2011 | Kelada | |
| 2011/0100218 A1 | 5/2011 | Wolfe | |
| 2011/0133487 A1 | 6/2011 | Oklejas, Jr. | |
| 2012/0012511 A1 | 1/2012 | Kim et al. | |

OTHER PUBLICATIONS

Kelada, Maher I., "Hollow Fiber Semipermeable membrane Element for Harnessing Osmotic Potential in Large Scale Industrial Processes," U.S. Appl. No. 13/768,228 mailed Feb. 15, 2013. [37 pages].
Ramon, et al., "Membrane-Based Production of Salinity-Gradient Power," 2011, Energy & Environmental Science, [12 pages].
Wikipedia, the free encyclopedia. (2012). "Osmotic Power." Retrieved on Oct. 8, 2012 from http://en.wikipedia.org/w/index.php?title=Osmotic_power&priintable=yes [8 pages].
Statkraft. (n.d.). "The Prototype: Torte Prototype Plant." Retrieved on Sep. 24, 2012 from http://www.statkraft.com/energy-sources/osmotic-pwer/prototype. [2 pages].
Nitto Denko. (2011). "Nitto Denko/Hydranautics and Statkraft to Create Osmotic Power." Retrieved on Oct. 8, 2012 from http://www.nitto.com/dpage/184.html. [3 pages].
The International Desalination & Water Reuse Quarterly Industry website. (2011). "Hydranautics to Supply Osmotic-Power Developer Statkraft." Retrieved on Oct. 8, 2012 from http:www.desalination.biz/news/. [3 pages].
Crystal Equity Research: Small Cap Strategist. (2012). "Statkraft's Foray into Osmotic Power." Retrieved on Oct. 8, 2012 from http://crystalequityresearch.blogspot.com/2012/08/statkrafts-foray-into-osmotic-power.html. [3 pages].
Altheokay. (2012). "Osmotic Power Generation: Energy, Technology & Policy." Retrieved on Oct. 8, 2012 from http://webberenergyblog.wordpress.com/2012/04/01osmotic-poer-generation/. [3 pages].
Stein Erik Skilhagen, Head of Osmotic Power, Statkraft. International Desalination Association Conference, "Osmotic Power—Developing a New, Renewable Energy Source," Nov. 2-3, 2010. [17 pages].
Werner Kofod Nielsen, Senior Advisor, Statkraft. 2011 Quingdao International Conference on Desalination and Water Reuse. "Progress in the Development of Osmotic Power." [24 pages].
United States Patent & Trademark Office (USPTO), "Restriction Requirement," U.S. Appl. No. 12/543,264 mailed May 31, 2012. [11 pages].
The Morris Law Firm, P.C. (MLF), "Response to Restriction Requirement," U.S. Appl. No. 12/543,264 mailed Jun. 15, 2012. [17 pages].
USPTO, "Non-Final Office Action," U.S. Appl. No. 12/543,264 mailed Sep. 18, 2012. [20 pages].
MLF, "Response to Non-Final Office Action," U.S. Appl. No. 12/543,264 mailed Oct. 12, 2012. [9 pages].
USPTO, "Non Final Office Action," U.S. Appl. No. 12/543,264 mailed Jan. 14, 2013. [14 pages].
MLF, "Response to Non-Final Office Action," U.S. Appl. No. 12/543,264 mailed Mar. 20, 2013. [13 pages].
USPTO, "Final Office Action," U.S. Appl. No. 12/543,264 mailed Jun. 20, 2013. [6 pages].
MLF, "Response to Final Office Action," U.S. Appl. No. 12/543,264 mailed Jun. 24, 2013. [4 pages].
USPTO, "Notice of Allowance," U.S. Appl. No. 12/543,264 mailed Jul. 5, 2013. [10 pages].
USPTO, "Non-Final Office Action," U.S. Appl. No. 13/768,228 mailed Jun. 18, 2013. [22 pages].
MLF, "Response to Non-Final Office Action," U.S. Appl. No. 13/768,228 mailed Aug. 7, 2013. [19 pages].
USPTO, "Final Office Action," U.S. Appl. No. 13/768,228 mailed Sep. 12, 2013. [25 pages].
MLF, "Response to Final Office Action," U.S. Appl. No. 13/768,228 mailed Oct. 14, 2013. [43 pages].
USPTO, "Advisory Office Action," U.S. Appl. No. 13/768,228 mailed Oct. 21, 2013. [5 pages].
MLF, "Response to Advisory Office Action," U.S. Appl. No. 13/768,228 mailed Nov. 11, 2013. [33 pages].
USPTO, "Non-Final Office Action," U.S. Appl. No. 13/768,228 mailed Dec. 5, 2013. [22 pages].
Kelada, Maher I., "Apparatus and Methods for Harnessing Osmotic Potential and Methods of Making and Using Same," World Intellectual Property Organization (WIPO), PCT Serial No. PCT/IB2014/058861 mailed Feb. 7, 2014. [112 pages].
Kelada, Maher I., "A Hollow Fiber Membrane Element and Methods of Making Same," U.S. Appl. No. 14/175,073 mailed Feb. 7, 2014. [76 pages].
USPTO, "Restriction Requirement," U.S. Appl. No. 14/175,073 mailed Apr. 17, 2014 [8 pages].
MLF, "Response to Restriction Requirement," U.S. Appl. No. 14/175,073 mailed Apr. 25, 2014 [4 pages].
USPTO, "Non-Final Office Action," U.S. Appl. No. 14/175,073 mailed May 16, 2014 [23 pages].

* cited by examiner

Final Fluids Status @ Equilibrium

Osmosis in Progress @ time > 0

Initial Fluids Status @ time = 0

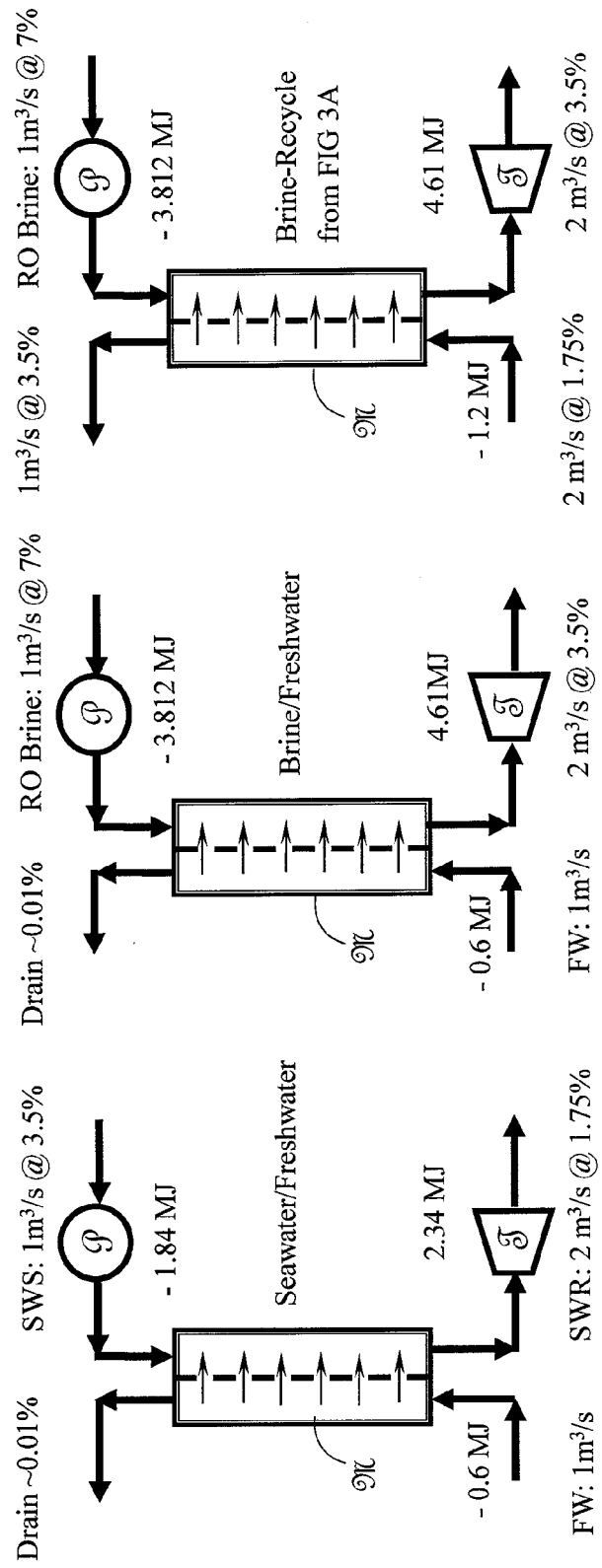

| Energy Estimation | FIG 3A | FIG 3B | FIG 3C |
|---|---|---|---|
| Potential energy generation (E) @85% | 2.34MJ | 4.61 MJ | 4.61MJ |
| Total pumping energy (PE) @75% | -2.44MJ | -4.41 MJ | -5.01 MJ |
| Membrane LMCD | 2.53 | 5.1 | 2.53 |
| Net energy generation (NE) | -0.1 MJ | 0.2 MJ | -0.4 MJ |
| System Efficiency NE/E | 0 | 4.3% | 0 |
| NE/m³ of brine feed and permeate flows | 0 MJ & 0 MJ | 0.2 MJ & 0.2 MJ | 0 MJ & 0 MJ |

FIG 4C

| Energy Estimation | FIG 4A - Cascade | FIG 4B - ISO Cell |
|---|---|---|
| Potential energy generation (E) @85% | 9.22 MJ | 6.95 MJ |
| Total pumping energy (PE) @75% | -9.42 MJ | -6.25 MJ |
| Membranes LMCD: | 2.53, 5.1 | 2.53, 2.53 |
| Net energy generation: (NE) | -0.2 MJ | 0.7 MJ |
| System efficiency NE/E | 0% | 10% |
| NE/m³ of brine feed & total inlet flows | 0 MJ & 0 MJ | .0.7 MJ & 0.35MJ |

FIG 4D

Membrane Countercurrent Flow Pattern
Log Mean Concentration Difference, LMCD $$\text{LMCD} = \frac{(C_1 - C_4) - (C_2 - C_3)}{\text{Ln}\left(\dfrac{C_1 - C_4}{C_2 - C_3}\right)}$$

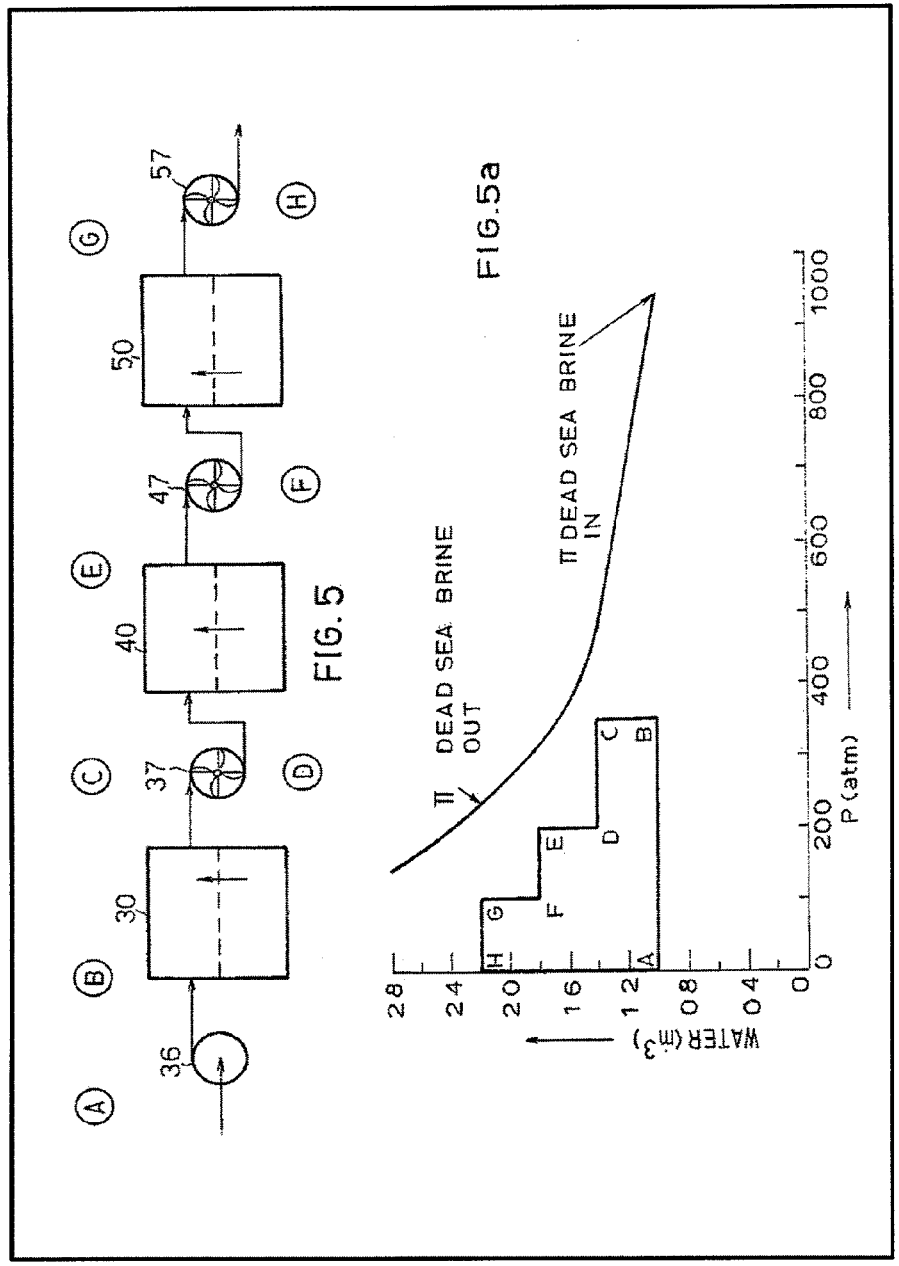
FIG 10: PRIOR ART, US No. 3,906,250 FOR LOEB

| Some Large Hyper Saline Lakes Suggested for ISO Energy Generation ||||
| High Salinity Water Source | Salt g/l | Conjugate Low Salinity Water | Salt g/l |
| --- | --- | --- | --- |
| The Great Salt Lakes, USA | 240 | Bear, Weber, Ogden, and Jordan Rivers | <1 |
| The Dead Sea, Israel/Jordan | 330 | The Mediterranean/The Red Sea | 35/45 |
| Lake Natron, Tanzania | 340 | Ngare Sero River | <1 |
| Lake Urmia, Iran | 330 | Zarrineh rood | <1 |
| Lake Van, Turkey | 330 | Bendimahi and Zilan rivers | <1 |
| Lake Eyre North, Australia | 330 | Diamantina River | <1 |
| Lake Assal, Djibouti | 348 | Hot Springs | 35-45 |
| Zaliv Kara-Bogaz-Gol, Turkmenstan | 350 | The Caspian Sea | 10-25 |
| Qattara Depression, Egypt [potential] | 330 | The Mediterranean | 35 |
| Chott el Djerid, Tunisia | 330 | The Mediterranean | 35 |
| Badwater Basin - Death Valley, USA- | 340 | The Pacific Ocean(if Accessible) | 35 |
| The Aral Sea, Kazakhstan | 300 | The Caspian Sea | 1-2 |
| Lake Baskunchak, Russia | 300 | The Volga River/The Caspian Sea | 1-2 |
| Costal Salt Ponds, Worldwide application | 330 | Adjacent Oceans and Seas | 35-45 |

FIG 11

| Energy Estimation | FIG 12A | FIG 12B |
|---|---|---|
| Potential energy generation (E) @85% | 15.8 MJ | 15.81 MJ |
| Sum of pumping energy (PE) @75% | -9.144 MJ | -9.08 MJ |
| Membrane LMCD | 12.98 | 8.85 |
| Net energy generation (NE): | 6.656 MJ | 6.73 MJ |
| System Efficiency NE/E & | 42.1% | 42.6% |
| NE/m³ of brine and of permeate | 6.66MJ & 2.22 MJ | 6.73MJ & 0.61 MJ |

FIG 12C

| FIG 13 B: Constant HC/HL = 2.0 & Tie-line = 1m³/sec, six (6) cell-system | | | | | | | |
|---|---|---|---|---|---|---|---|
| Energy estimation | CELL 1 | CELL 2 | CELL 3 | CELL 4 | CELL5 | CELL 6 | TOTAL |
| Potential energy generation, E | 2.68 MJ | 5.43MJ | 8.27 MJ | 11.19 MJ | 14.19 MJ | 16.75 MJ | 58.51MJ |
| Sum of pumping energy, PE | -2.73 MJ | -4.39 MJ | -6.77 MJ | -9.28 MJ | -11.92 MJ | -14.69 MJ | -49.78 MJ |
| Membrane LMCD | 2.88 | 2.88 | 2.88 | 2.88 | 2.88 | 2.88 | 2.88 (EST.) |
| Net energy generation, NE | -0.05 MJ | 1.04 MJ | 1.50 MJ | 1.91 MJ | 2.27 MJ | 2.06 MJ | 8.73 MJ |
| System efficiency NE/E % | 0% | 19.2% | 18.1% | 17.1% | 16% | 12.3% | 14.9% |
| System Performance: Energy Recovery Efficiency 14.9%, LMCD average: 2.88, Net Energy per 1m³ HC brine:8.73 MJ | | | | | | | |

| FIG 14 B: Constant HC/HL = 3.0 & Tie-line = 2m³/sec, four (4) cell-system | | | | | | | |
|---|---|---|---|---|---|---|---|
| Energy estimation | CELL 1 | CELL2 | CELL 3 | CELL4 | CELL 5 | CELL 6 | TOTAL |
| Potential energy generation, E | 4.02 MJ | 8.15 MJ | 12.41 MJ | 16.79 MJ | N/A | N/A | 41.37 MJ |
| Sum of pumping energy, PE | -3.36 MJ | -4.52 MJ | -7.06 MJ | -9.79 MJ | | | -24.73MJ |
| Membrane LMCD | 3.64 | 3.64 | 3.64 | 3.64 | | | 3.64 (EST.) |
| Net energy generation, NE | 0.66 MJ | 3.63 MJ | 5.35 MJ | 7.0 MJ | | | 16.64 MJ |
| System efficiency NE/E % | 16.4% | 44.5% | 43.1% | 41.7% | | | 40.2% |
| System Performance: Energy Recovery Efficiency 40%, LMCD average: 3.64, Net Energy per 1m³ HC brine: 16.64 MJ | | | | | | | |

FIG 15

| FIG 16 B: Progressively ascending HC/HL from 2.0 to 4.0, a Tie-line of 1m³/sec, three (3) cells | | | | |
|---|---|---|---|---|
| Energy estimation | CELL 1 | CELL 2 | CELL 3 | TOTAL |
| Potential energy generation, E @ 85% | 4.03 MJ | 4.62 MJ | 5.51 MJ | 14.16 MJ |
| Sum of pumping energy, PE @ 75% | -3.84 MJ | -2.56 MJ | -2.45MJ | -8.85 MJ |
| Membrane LMCD | 4.32 | 3.73 | 4.91 | 4.31 (EST.) |
| Net energy generation, NE | 0.19MJ | 2.06 MJ | 3.06 MJ | 5.31 MJ |
| System efficiency NE/E % | 4.7% | 44.6% | 55.5% | 37.5% |

System Performance: Energy Recovery Efficiency 37.5%, LMCD average: 4.31, Net Energy per 1m³ HC brine:15.9 MJ

| FIG 17 B: Constant HC/HL of 4, a Tie-line of 3m³/sec, three (3) cell-system | | | | |
|---|---|---|---|---|
| Energy estimation | CELL 1 | CELL 2 | CELL 3 | TOTAL |
| Potential energy generation, E @ 85% | 5.35 MJ | 10.87 MJ | 16.52 MJ | 32.73 MJ |
| Sum of pumping energy, PE @ 75% | -3.99 MJ | -4.64 MJ | -7.34MJ | -15.97MJ |
| Membrane LMCD | 4.32 | 4.32 | 4.32 | 4.32 (EST.) |
| Net energy generation, NE | 1.51 MJ | 6.23 MJ | 8.72 MJ | 16.77 MJ |
| System efficiency NE/E % | 28.2% | 57.3% | 54.3% | 51% |

System Performance: Energy Recovery Efficiency 51%, LMCD average: 4.32, Net Energy per 1m³ HC brine:16.77 MJ

FIG 18

Five (5) cell-system, dual brine, constant cell HC/HL of 5.0, 4m³/s Tie-line

360 MW Dry Salt Lake ISO Power Generation Plant

| Energy Estimation | CELL 1 | CELL 2 | CELL 3 | CELL 4 | TOTAL |
|---|---|---|---|---|---|
| Potential energy generation (E) @85% | 137MJ | 168 MJ | 195 MJ | 224 MJ | 724 MJ |
| Sum of pumping energy (PE) @75% | -100 MJ | -73MJ | -88 MJ | -103 MJ | -364 MJ |
| Membrane LMCD | 5.33 | 2.16 | 2.16 | 2.16 | 3 (Est.) |
| Net energy generation (NE) | 37 MJ | 95MJ | 107 MJ | 121 MJ | 360MJ |
| System Efficiency NE/E% | 27% | 56.5 % | 54.9 % | 54 % | 49.7% |

System Performance: Energy Recovery Efficiency 49.7%, LMCD average: ~3, Net Energy per 1m³ HC brine: 36 MJ and Net Energy per 1m³ permeate 12 MJ

FIG 19B

62 MW Closed Dual Brine ISO Power Generation System

| Energy Estimation | CELL 1 | CELL 2 | CELL 3 | CELL 4 | CELL 5 | TOTAL |
|---|---|---|---|---|---|---|
| Potential energy generation, E | 13.59 MJ | 17.13MJ | 19.94 MJ | 22.87MJ | 25.84 MJ | 99.37 MJ |
| Sum of pumping energy, PE | -5.06 MJ | -6.15 MJ | -7.34 MJ | -8.58 MJ | -10 MJ | -37.13MJ |
| Membrane LMCD | 9.9 | 2.48 | 2.0 | 2.0 | 2.0 | 3.7 (EST.) |
| Net energy generation, NE | 8.53 MJ | 10.98 MJ | 12.6MJ | 14.29MJ | 15.84 MJ | 62.24MJ |
| System efficiency NE/E % | 62.8% | 64.1% | 63.2% | 62.5% | 61.3% | 62.6% |

System Performance: Energy Recovery Efficiency 62.6%, LMCD average:4.32, Net Energy per 1m³ HC brine: 62.2 MJ and Net Energy per 1m³ permeate 15.6MJ

FIG 20B

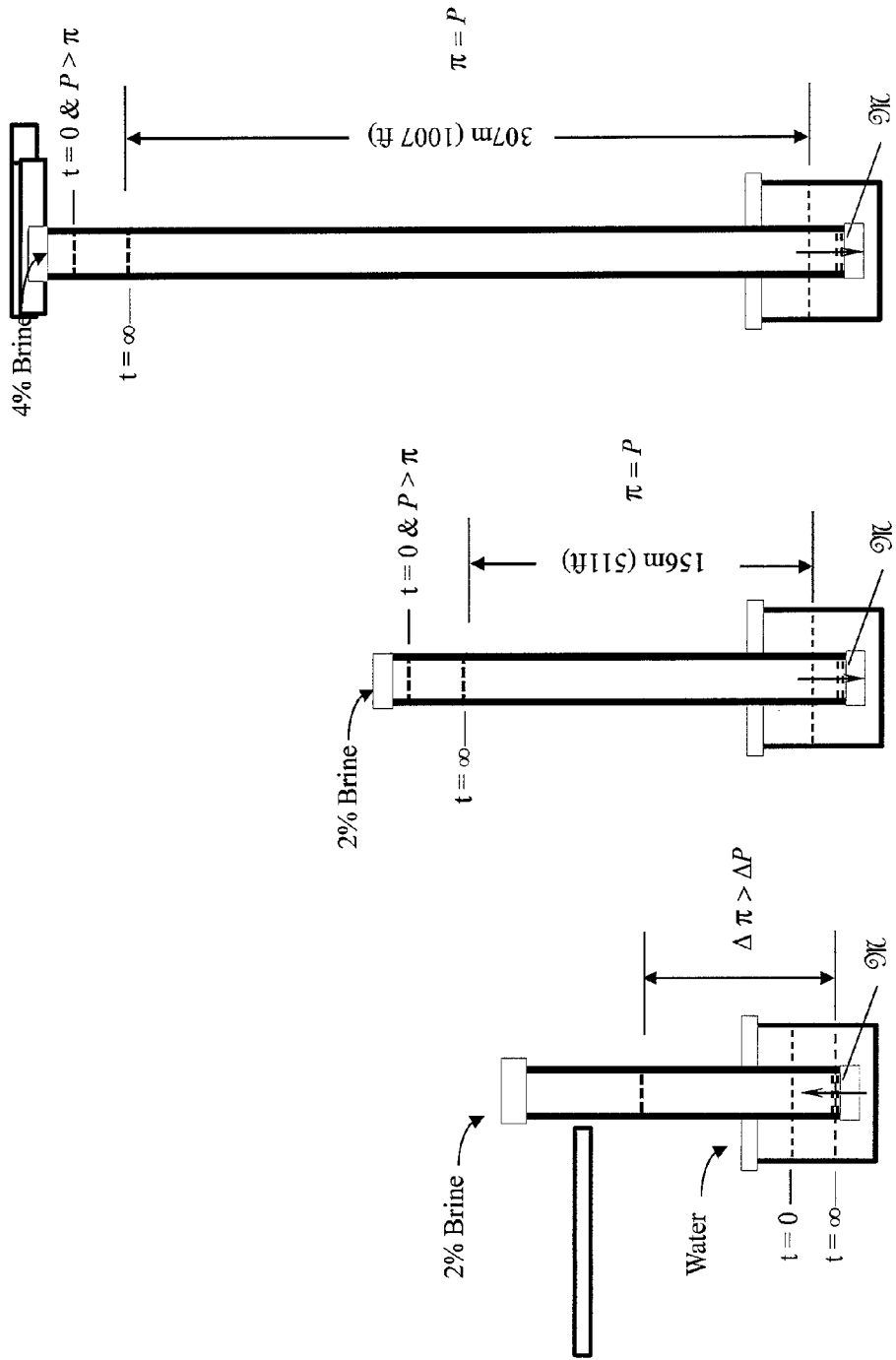

ISO Reverse Osmosis [ISO-RO] Water Extraction-Concentration System

INDUCED SYMBIOTIC OSMOSIS [ISO] FOR SEAWATER DESLINATION AND PUMPING TO HIGH ALTITUDE

PRIORITY OF INVENTION

The resent application is a divisional of application Ser. No. 12/543,264 which issued as U.S. Pat. No. 8,545,701 on Oct. 1, 2013, the full text thereof being incorporated herein by reference.

FIELD OF THE INVENTION

The present application relates to a method and apparatus of pumping desalinated water to high altitudes.

Definitions

Osmosis is the spontaneous movement of water, through a semipermeable membrane that is permeable to water but impermeable to solute, where water moves from a solution in which solute is less concentrated to a solution in which solute is more concentrated.

The driving force of the flow movement is the difference in the chemical potential on the two sides of the semipermeable membrane, with the solvent moving from a region of higher potential (generally a lower solute concentration) to the region of lower potential (generally higher solute concentration).

"Chemical Potential" appears to be an ambiguous and elusive terminology. In fact, it is one of the most important partial molal quantities. It is the energy potential associated with the activity of the ions of an ionizable substance. It is equal to the rate of change of system's free energy, known as Gibbs free energy, of a system containing a number of moles of such substance, when all other system parameters; temperature, pressure and other components are held constant. Simply, chemical potential is a form of energy like other kinds of potential; electrical, gravitational, momentum, magnetic, surface tension, etc. where, it is spontaneous and in the direction from high to low.

The difference in chemical potential of a substance in two adjacent phases separated by a semipermeable membrane determines the direction in which the substance diffuses spontaneously. When the components of a mixture have the same chemical potential no chemical transport or reaction takes place, and no mutual diffusion will occur, because there is no driving force. The chemical potential is an intensive property of a substance in a phase.

To prevent this movement of water across the semipermeable membrane, a pressure has to be imposed to equalize the force created by the difference in the chemical potential of the solution across said membrane. This force is named osmotic pressure. If the imposed pressure exceeds this limit, then water begins to flow from the region of higher solute concentration to the region of lower solute concentration. In this case, the force is named reverse osmosis pressure.

Regarding the title of this invention, the inventor believes that osmosis is nature's gift to life. It is the vehicle to transport fluids in all living cells and without it, all biological functions and all forms of life ceases to exist! This phenomenon is attracting the attention of researchers as a means to generate power. They tend to describe it in industrial terms such as forward osmosis, ordinary osmosis, direct osmosis, pressure retarded osmosis, etc.

In order to harness this natural phenomenon, the inventor believes that relevant potential fields should be established to induce and bring about the wonders of this phenomenon. Therefore, the inventor prefers to describe all applications that utilize the power of osmosis for the benefit of mankind as "Induced Osmosis".

Further, the term symbiosis although a biological phenomenon, its generic or metaphorical concept refers to a mutually relationship of cyclic reverberation, without altering or modifying any of the specific components of the involved systems. In industrial applications, symbiosis is a process whereby a waste or less valuable byproduct in one industry is turned into a resource for use in one or more other industries. In essence, it is the process of optimizing functions of interrelated systems and achieves their ultimate availability. Therefore, the inventor is naming the process of using osmosis in interrelated sequence of power generation cells as "Induced Symbiotic Osmosis" and is abbreviated here by the acronym "ISO".

SUMMARY OF THE INVENTION

In one embodiment, the present application provides an induced symbiotic osmosis pump (ISOP) comprising: a closed loop comprising a riser pipe and a downpipe having substantially the same length fluidly communicating at a base with an induced osmosis semipermeable membrane and fluidly communicating at an opposed end with a brine pump fluidly communicating with a pressure exchanger fluidly communicating with a reverse osmosis membrane, the downpipe comprising a check valve; the induced osmosis semipermeable membrane of the closed loop fluidly communicating with an initial reverse osmosis module fluidly communicating with a brine pump fluidly communicating with a source of fluid having an initial salinity; the brine pump electronically communicating with an electrical source; and, the reverse osmosis membrane fluidly communicating with a storage tank.

In one embodiment, the present application provides an induced symbiotic osmosis pump (ISOP) comprising: a plurality of the closed loops comprising an initial closed loop and a final closed loop, each closed loop comprising a riser pipe and a downpipe having substantially the same length fluidly communicating at a base with an induced osmosis semipermeable membrane and fluidly communicating at an opposed end with a brine pump fluidly communicating with a pressure exchanger fluidly communicating with a reverse osmosis membrane; the downpipe comprising a check valve, wherein the initial closed loop fluidly communicates with an initial reverse osmosis module fluidly communicating with an initial brine pump in fluid communication with a source of fluid having an initial salinity and the final closed loop fluidly communicates with the reverse osmosis membrane fluidly communicating with the storage tank; wherein the riser pipe and the downpipe comprise bores having a cross sectional area proportional to the inverse of the downpipe to the riser pipe concentration ratio; the induced osmosis semipermeable membrane of the closed loop fluidly communicating with an initial reverse osmosis module fluidly communicating with a brine pump fluidly communicating with a source of fluid having an initial salinity; the brine pump electronically communicating with an electrical source; and, the reverse osmosis membrane fluidly communicating with a storage tank.

In one embodiment, the present application provides a method of operating an induced symbiotic osmosis pump (ISOP), the method comprising: precharging a plurality of closed loops in series with an initial brine having an initial salt concentration sufficiently high to create a hydraulic head effective to reach an intended elevation; spontaneously permeating water across a semipermeable membrane into a riser of an initial closed loop, the water permeating from a lower salt content brine to a higher salt content brine without the need for external force; developing a column in the plurality of closed loops in series, the column exhibiting a hydraulic head equivalent to the difference in osmotic pressure across the semipermeable membrane of the respective closed loop; employing the hydraulic head to sustain and convey the column from an initial closed loop at an initial elevation to a final closed loop at a substantially higher intended elevation; and, collecting a quantity of desalinated brine at the substantially higher altitude in a quantity comprising a volume of water that spontaneously permeates from the initial brine to the initial closed loop at an initial elevation.

BRIEF DESCRIPTION OF THE DRAWINGS

This invention pertains to a conceptual development of new innovative large scale renewable energy technology for reclaiming salinity power, unlike any other current alternative power generation technology. Several mathematical relations, tabulated data and schematic figures are presented to clearly define the invention concept and its wide global application. However, simplification of drawings and assigned numbering system are necessary to avoid ambiguity in understanding the process.

Due to the large number of the figures needed to support the claims of this invention, the applicant chooses to group those figures by their application to facilitate understanding the concept of this work. A relatively lengthy review of basic thermodynamics law and mathematical relations that dictate the osmosis phenomenon and its applications seems important to this work and is also presented.

Group one comprises FIGS. 1-9 defining the concept of Induced Symbiotic Osmosis [ISO], its basic theory, thermodynamic relations and design criteria.

Figure 1C:
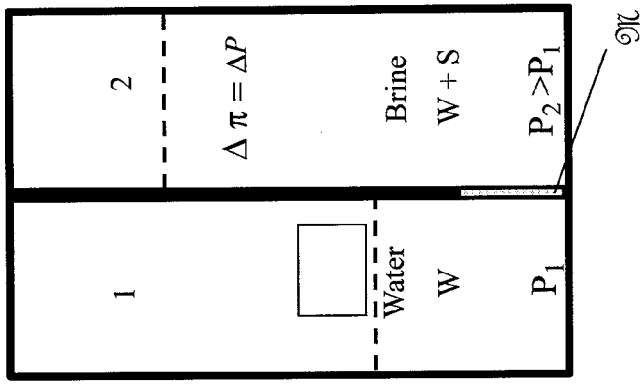
Figure 1B:
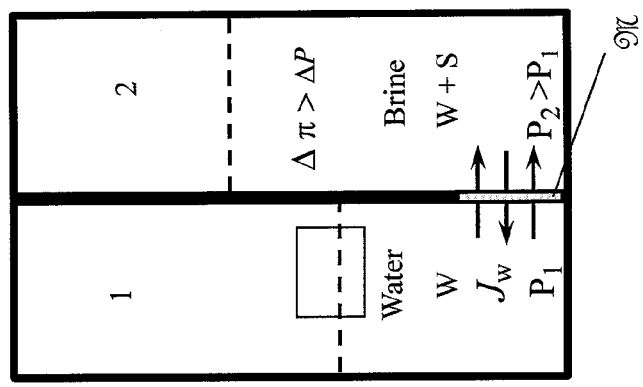
Figure 1A:
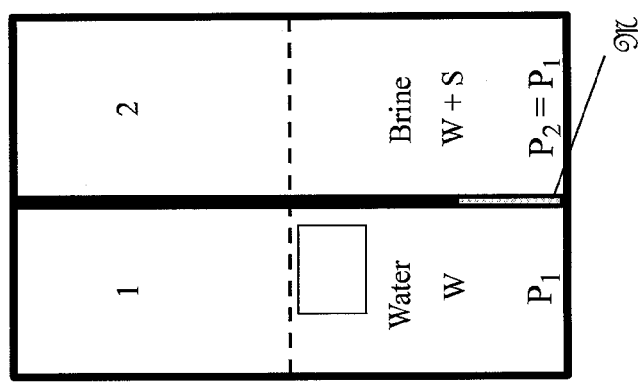

FIGS. 1A, 1B and 1C illustrate water/brine osmotic equilibrium and related parameters.

Figures 2A, 2B:
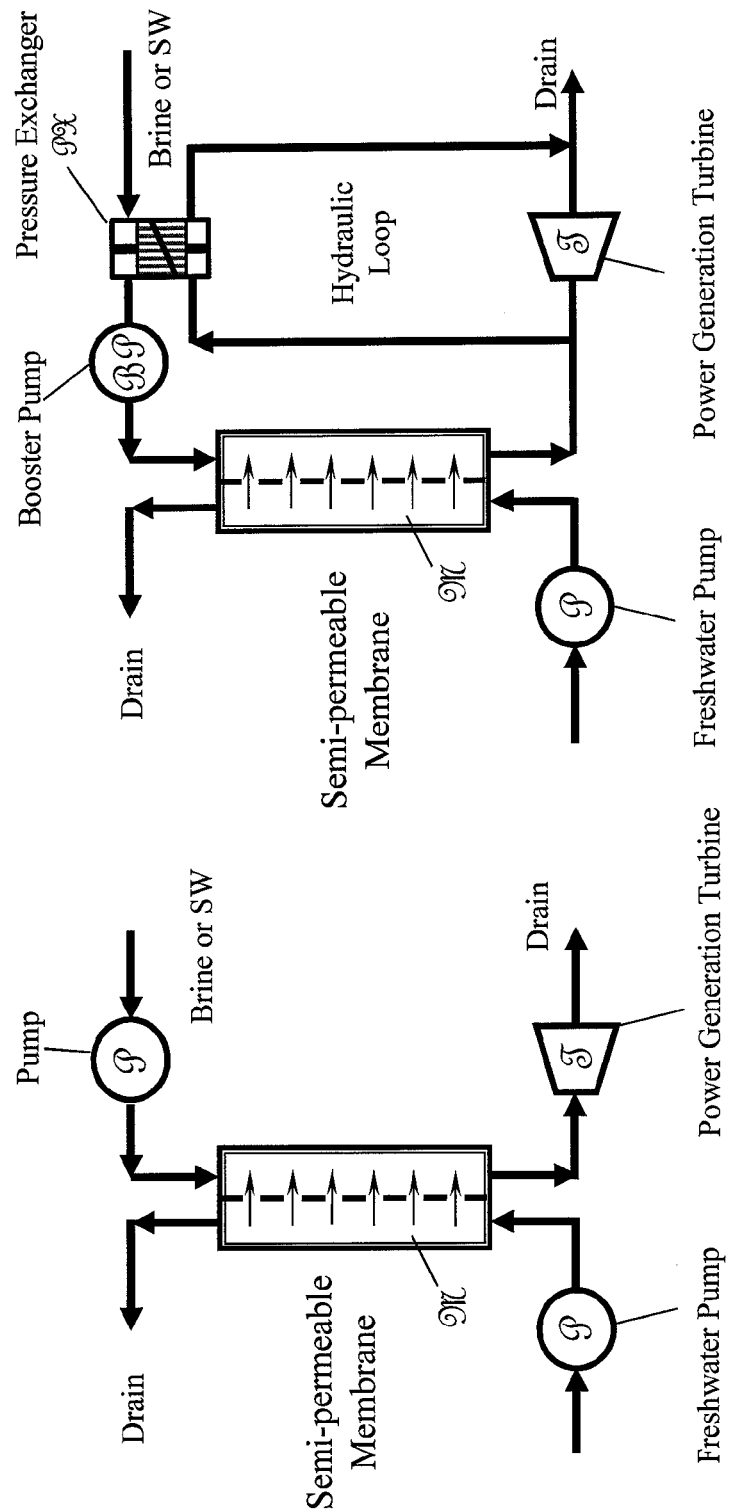

FIGS. 2A and 2B illustrate basic system components of two arrangements for power generation by osmosis, as adopted by both the prior art and by the ISO process of the subject application.

FIGS. 3A, 3B, 3C and 4C illustrate three cases of segregated stages for osmotic energy generation, employing the basic system of FIG. 2.

Figures 4A, 4B:
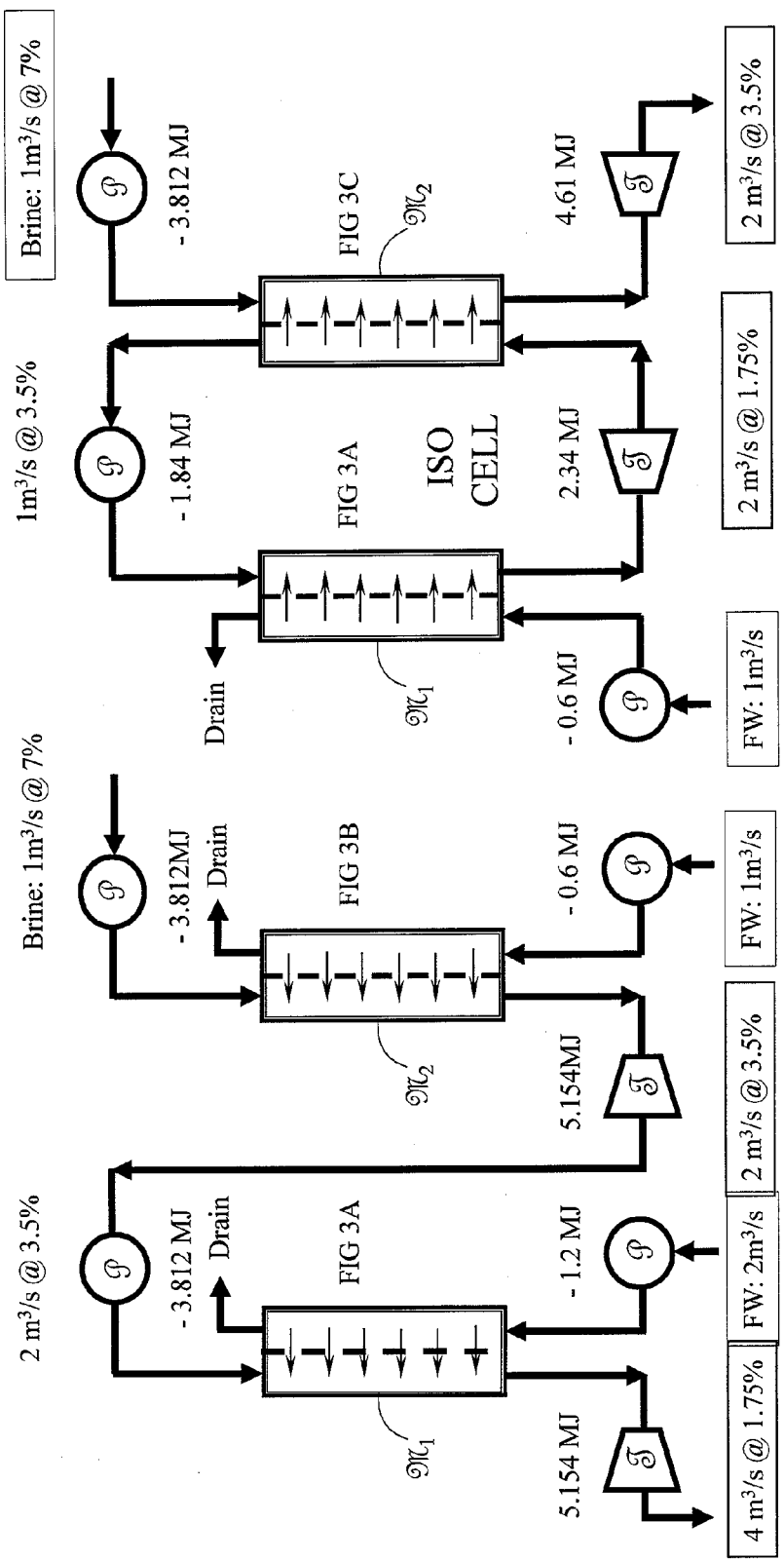

FIGS. 4A, 4B, and 4D illustrate a rearrangement of the individual stages of FIG. 3 forming two dual stage systems and related energy analysis, one rearrangement is for a cascade system formed by combining FIG. 3A and FIG. 3B and the other rearrangement is for an ISO system, the subject of this invention, formed by combining FIG. 3A and FIG. 3C.

FIGS. 5A, 5B, 5C and 5D illustrate simulation of a reversible liquid power ISO Cycle and its comparison with the acclaimed reversible Carnot Cycle.

Figure 6:
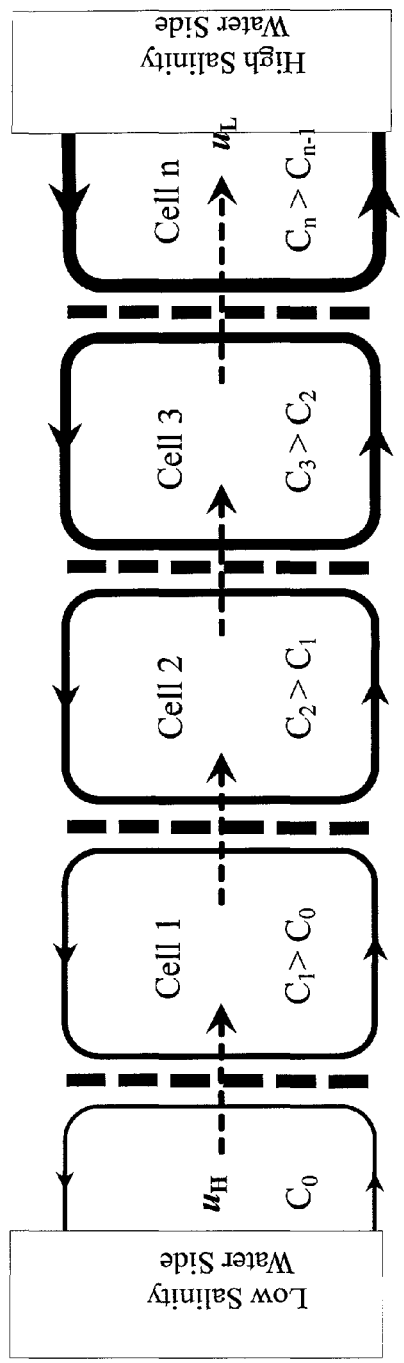

FIG. 6 illustrates the vision of the inventor in developing the concept of an Induced Osmosis train, comprising several closed loop cells running symbiotically and indicating progression of concentration profile and its direction.

Figure 7:
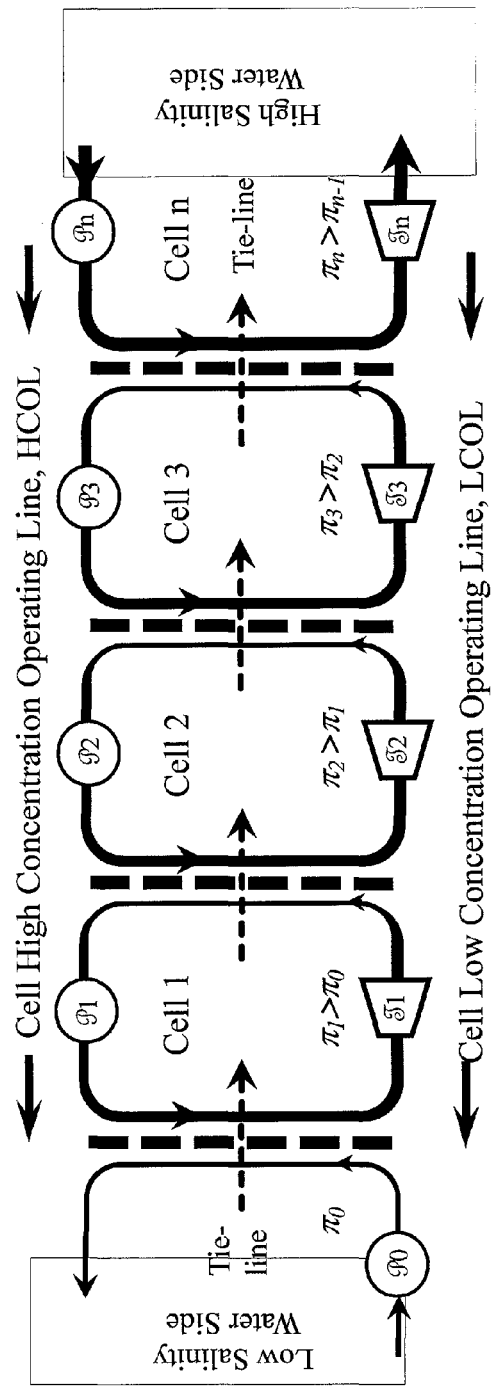

FIG. 7 illustrates the vision of the inventor in developing the Induced Osmosis train, comprising several closed loop cells running symbiotically, indicating the concentration operation lines and progression of osmotic pressure in the ISO cells' train.

Figure 8A:
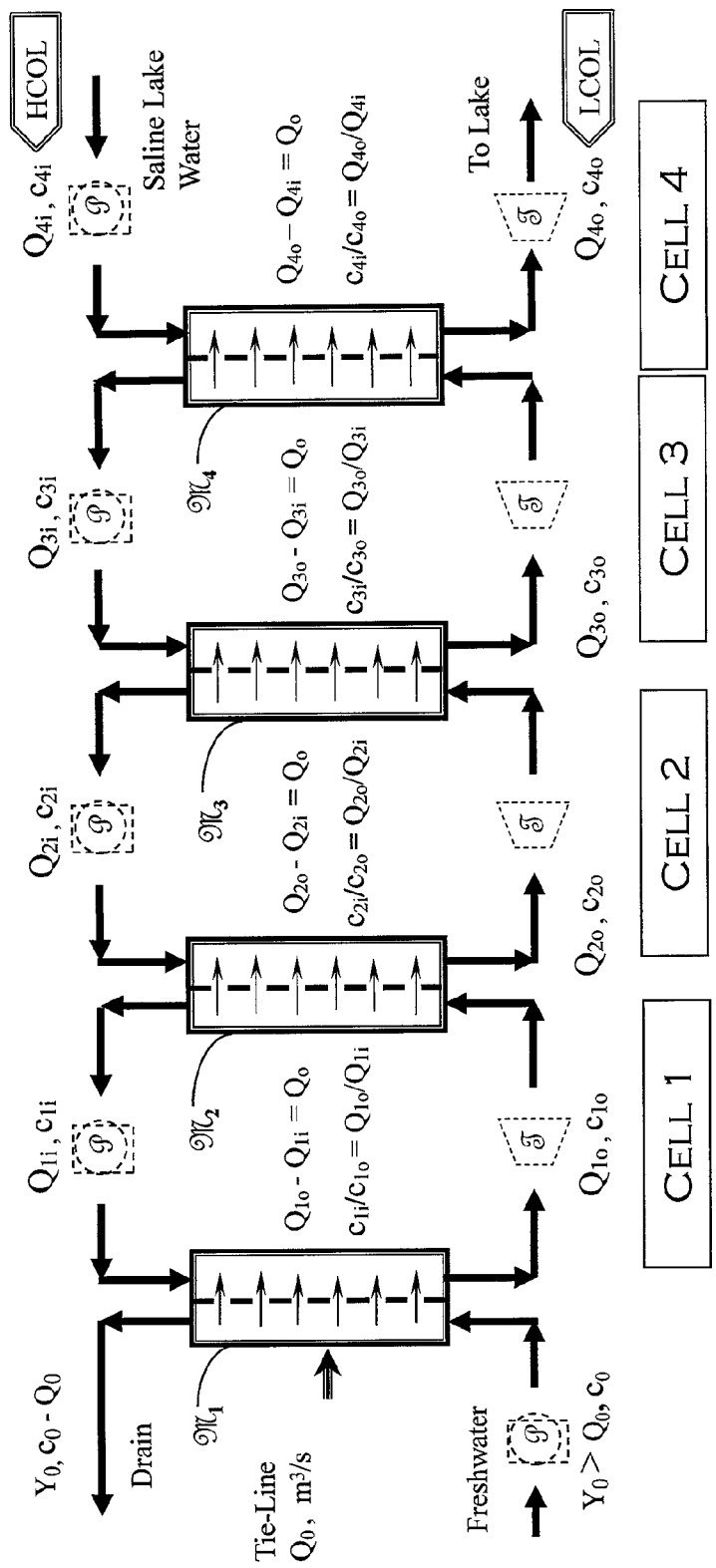
Figure 8B:
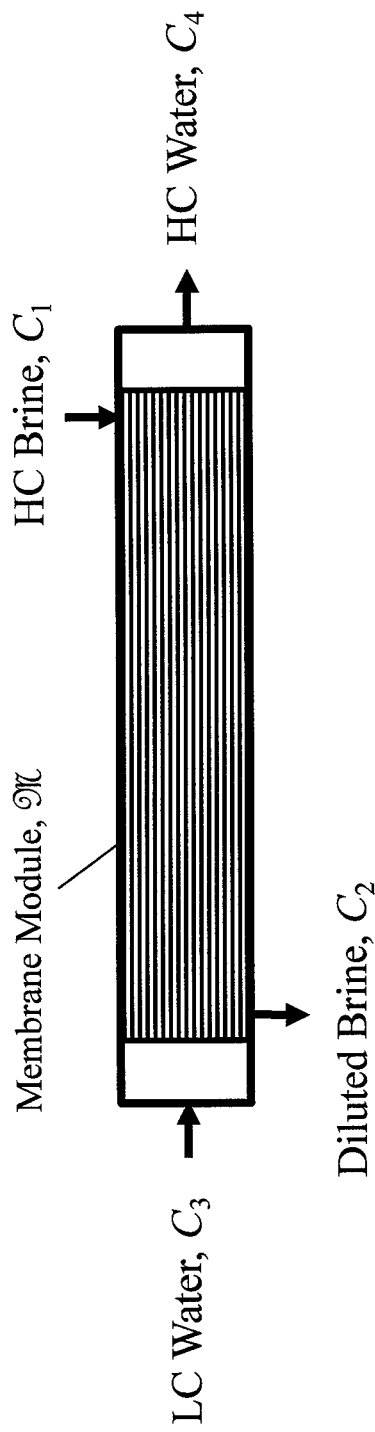

FIGS. 8A and 8B illustrate a schematic design of basic multi-cell system, indicating mass and concentration mathematical model for simulating an ISO power generation system.

Figure 9:
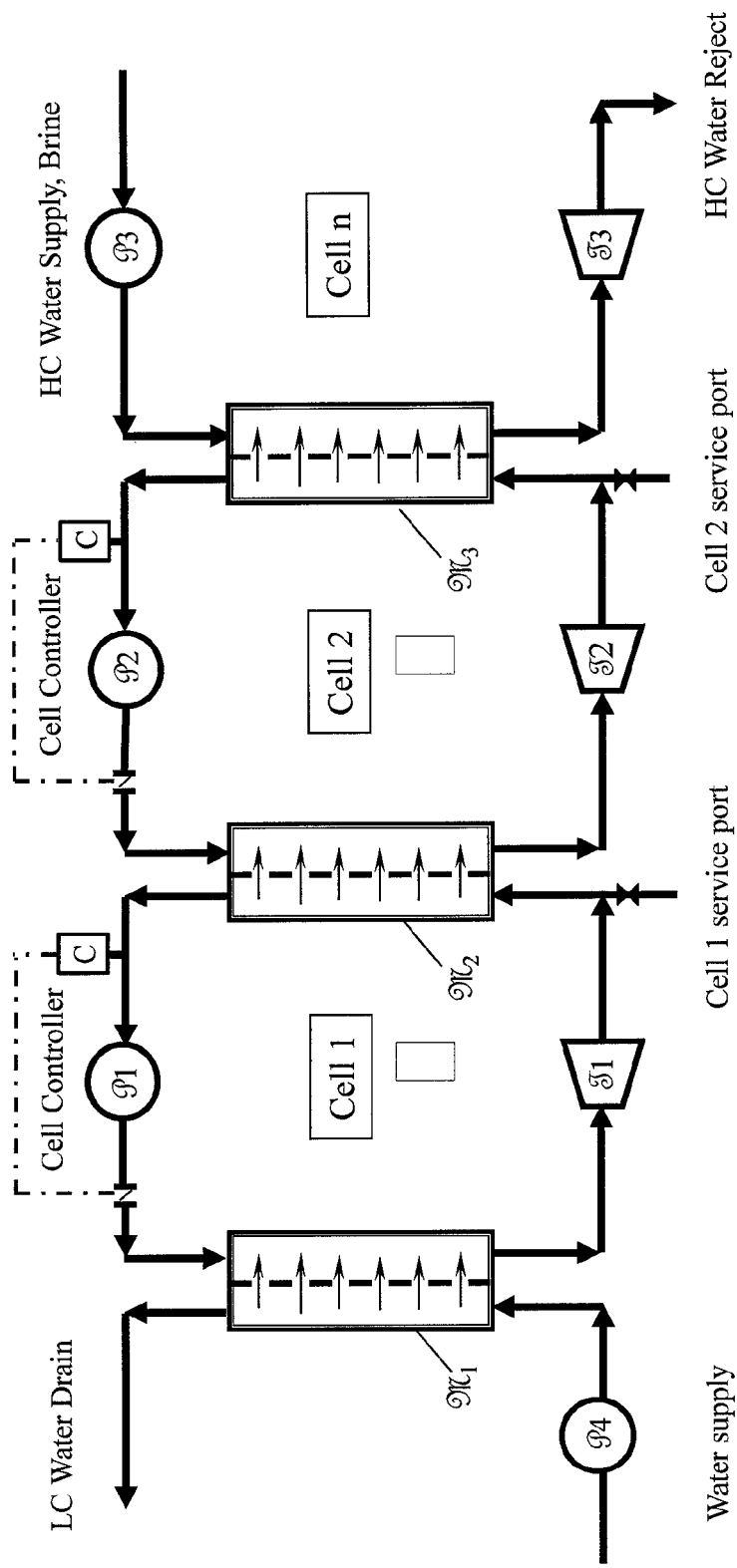

FIG. 9 illustrates ISO cell design components and process operation with emphasis on individual cell control and system function.

Group two comprises FIG. 10 discussing, in details, prior art for large scale energy generation by osmosis.

Figure 5A:
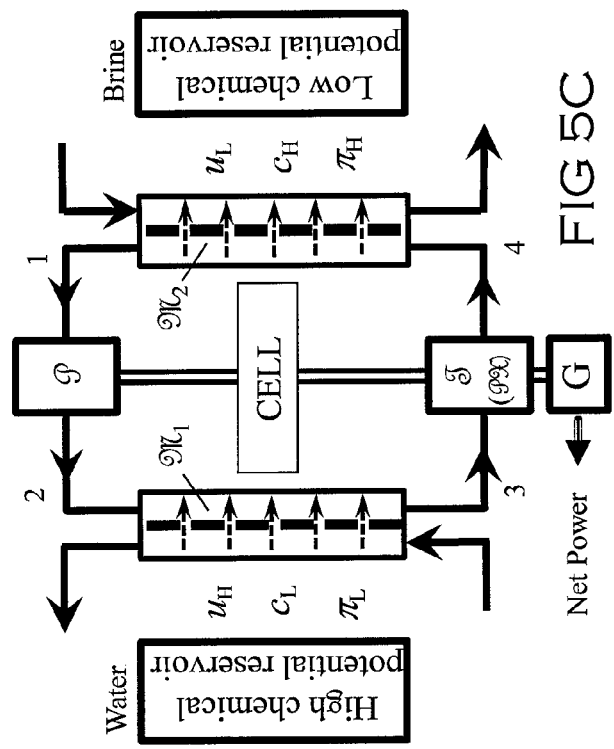

FIG. 10 illustrates FIG. 5 and FIG. 5a of U.S. Pat. No. 3,906,250 describing large-scale Pressure Retarded Osmosis, PRO to generate power from the Dead Sea.

Group three comprises ISO design methodology and calculation presented as a text.

Group four comprises FIGS. 11-19 elaborating the application of the Induced Symbiotic Osmosis concept [ISO] as described in FIGS. 6-9 for power generation from hyper saline waters.

FIG. 11 tabulates some large hyper saline impoundments and their conjugate low salinity water that are suggested for ISO applications.

Figures 12A, 12B:
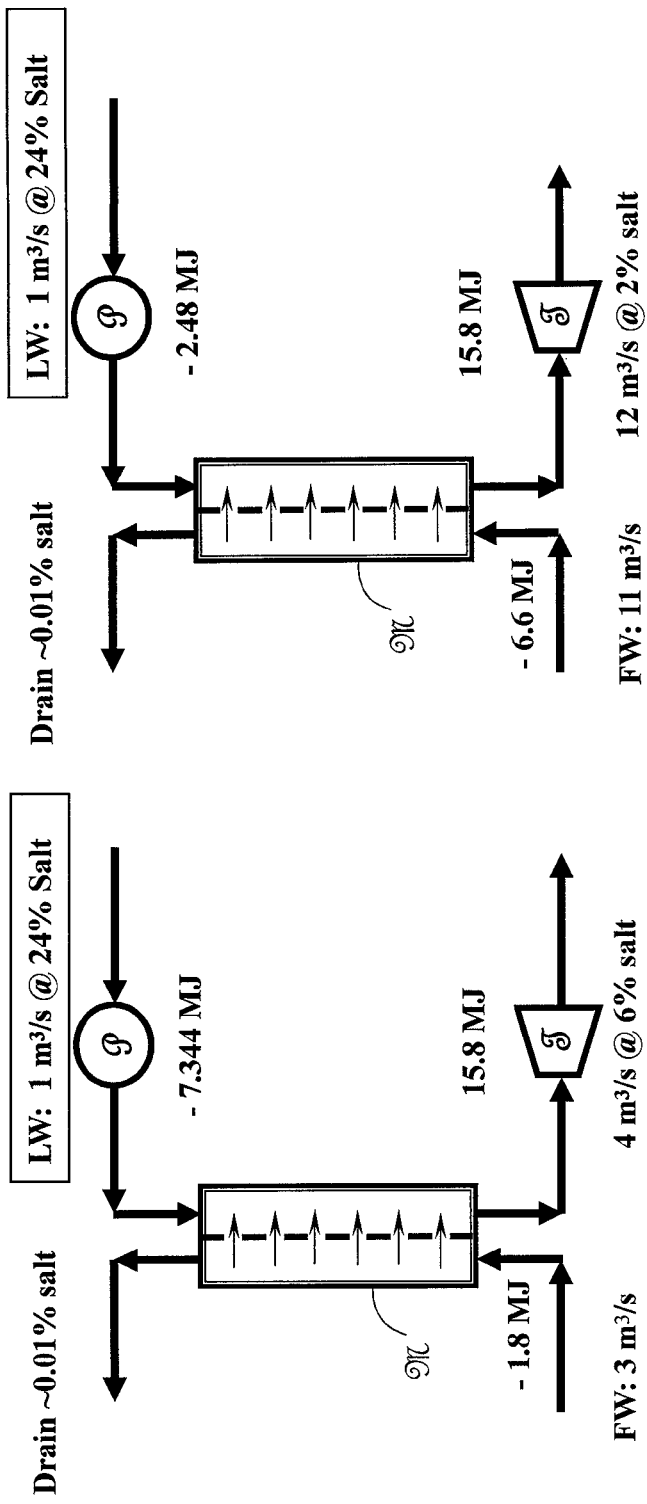

FIG. 12A illustrates a single stage semipermeable membrane; employing 1 $m^3/s$ saline lake brine containing 24% salt to induce 3 $m^3/s$ permeated water with negligible amount of salt.

FIG. 12B illustrates a single stage semipermeable membrane; employing 1 $m^3/s$ saline lake brine containing 24% salt to induce 11 $m^3/s$ permeated water with negligible amount of salt.

FIG. 12C illustrates summary of estimated energy recovery of systems of FIGS. 12A and 12B.

Figure 13A:
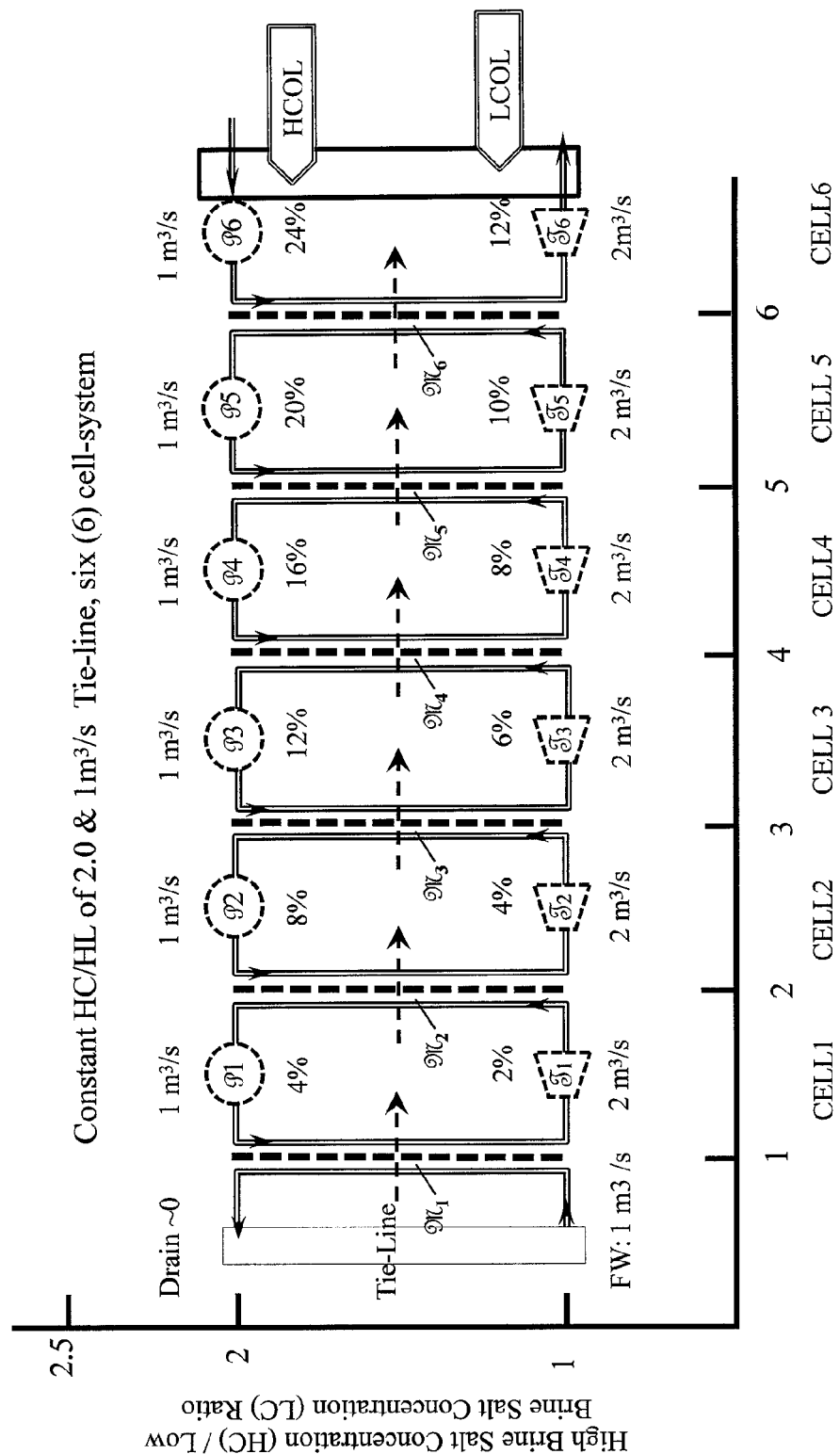

FIG. 13A illustrates an Induced Symbiotic Osmosis [ISO] of six (6) cell-system employing, 1 $m^3/s$ saline lake brine, containing 24% salt concentration, operating at a constant permeate flow across all cells with constant high brine salt concentration to low brine salt concentration ratio of 2.0 across all cells.

Figure 14A:
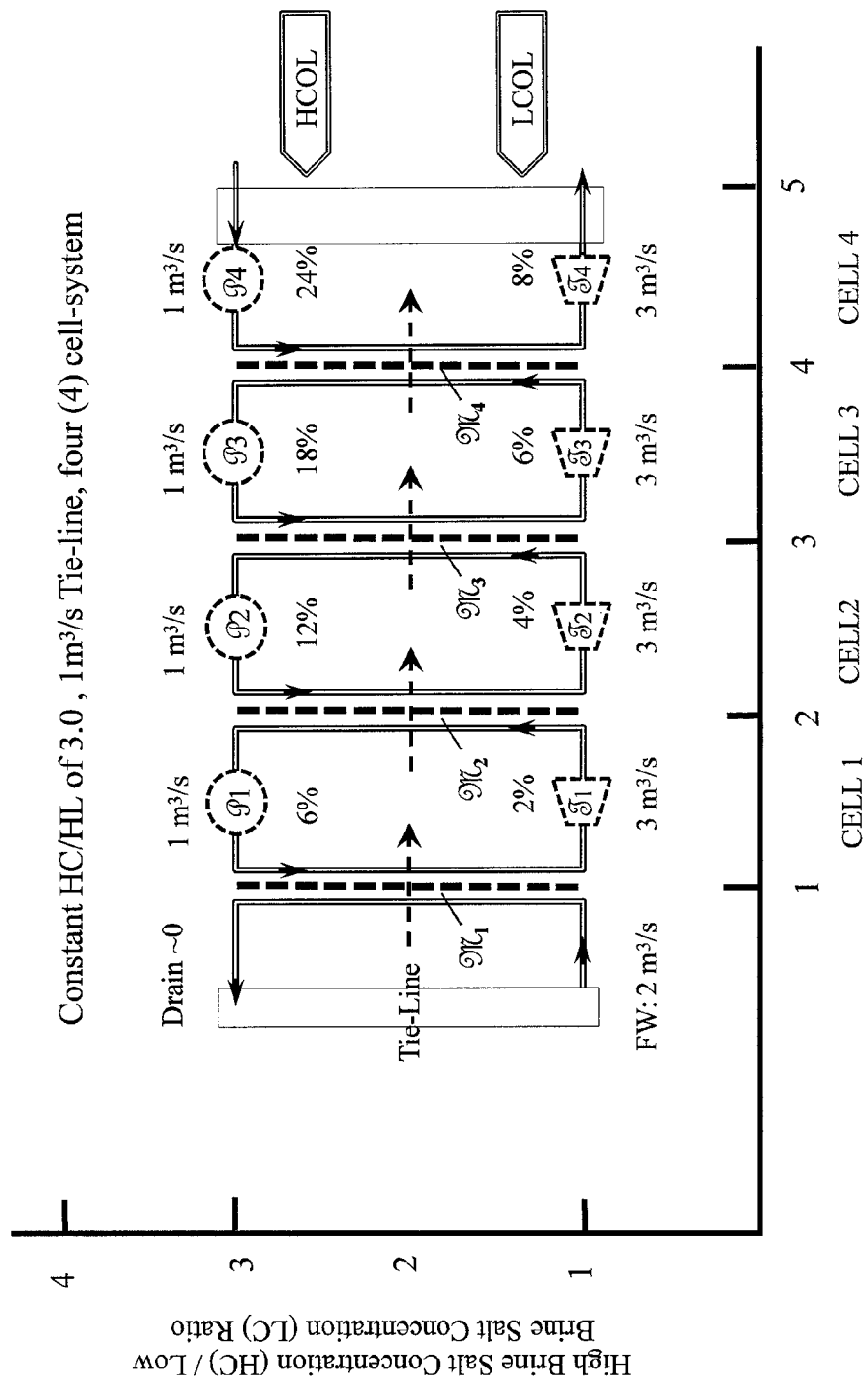

FIG. 14A illustrates an Induced Symbiotic Osmosis [ISO] of four (4) cell-system employing 1 $m^3/s$ saline lake brine containing 24% salt concentration, operating at a constant permeate flow across all cells with constant high brine salt concentration to low brine salt concentration ratio of 3.0 across all cells.

FIG. 15 illustrates compiled power recovery analysis data from cases of FIGS. 13B and 14B.

Figure 16A:
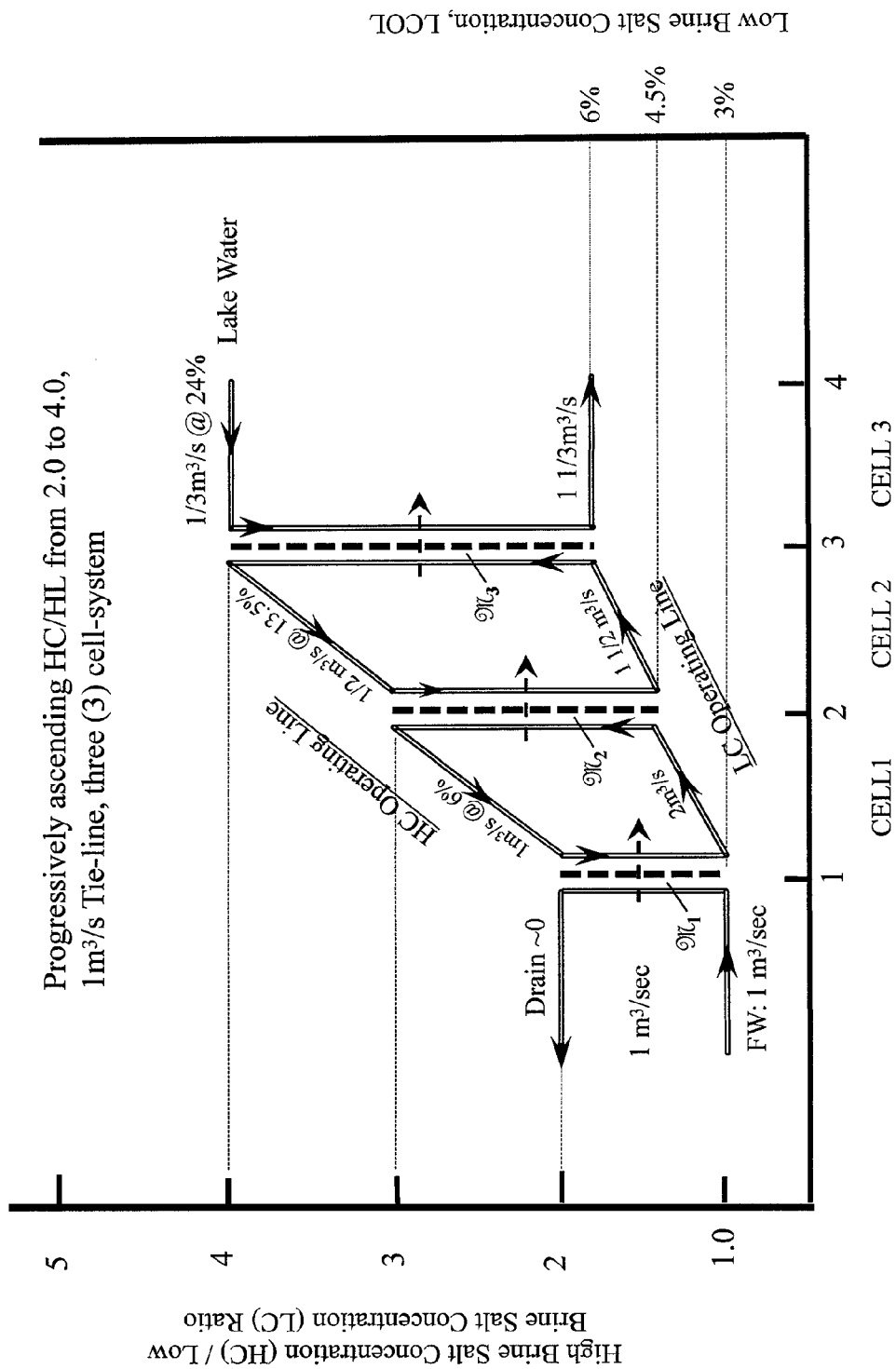

FIG. 16A illustrates an Induced Symbiotic Osmosis [ISO] of three (3) cell-system set to induce 1 $m^3/s$ of permeated water, operating at progressively increasing high brine salt concentration to low brine salt concentration ratio from 2.0 to 4.0, resulting in progressively decreasing cell brine rate.

Figure 17A:
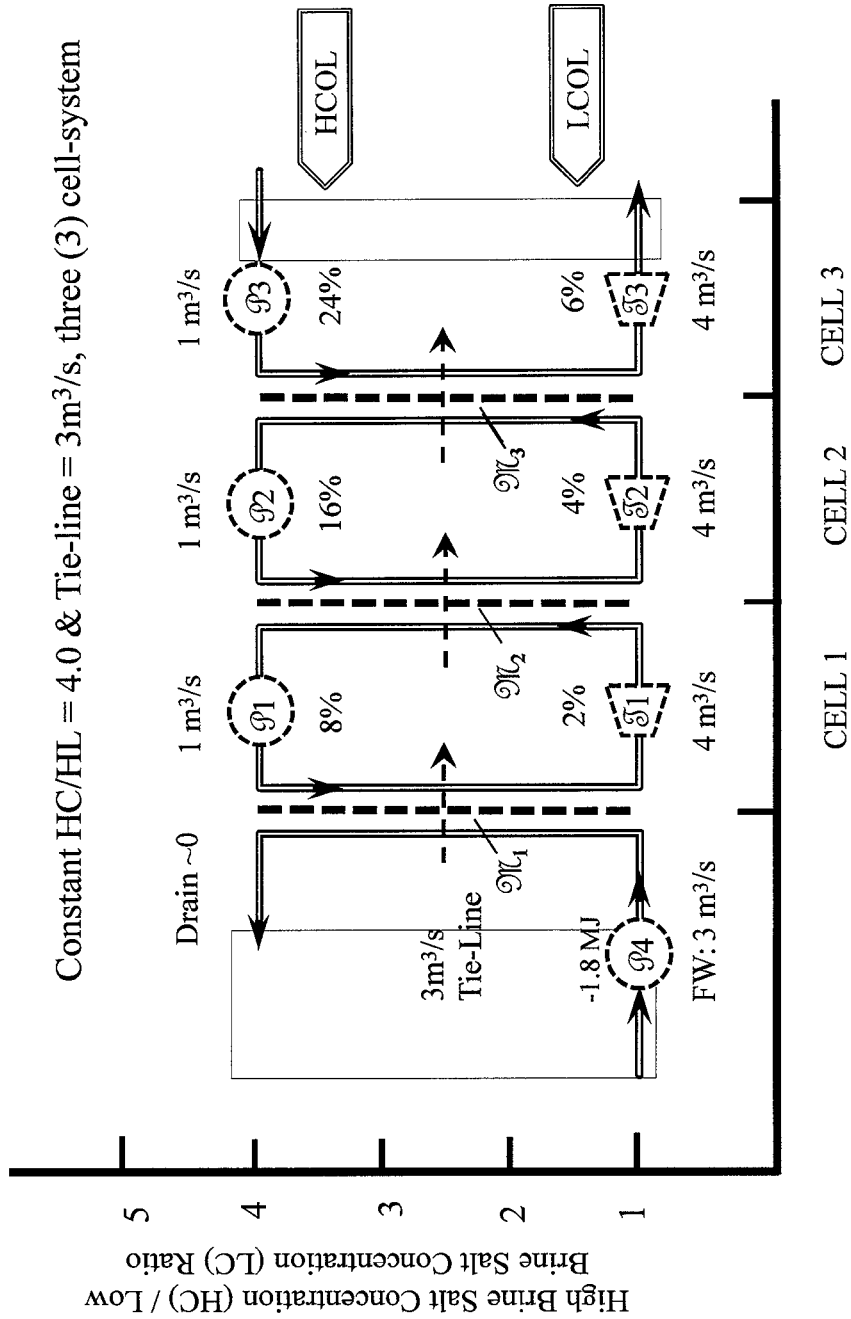

FIG. 17A illustrates an Induced Symbiotic Osmosis [ISO] of three (3) cell-system employing 1 $m^3/s$ saline lake brine containing 24% salt concentration, operating at a constant permeate flow across all cells with constant high brine salt concentration to low brine salt concentration ratio of 4.0 across all cells.

FIG. 18 illustrates compiled power recovery data from cases of FIGS. 16B, and 17B.

Figure 19A:
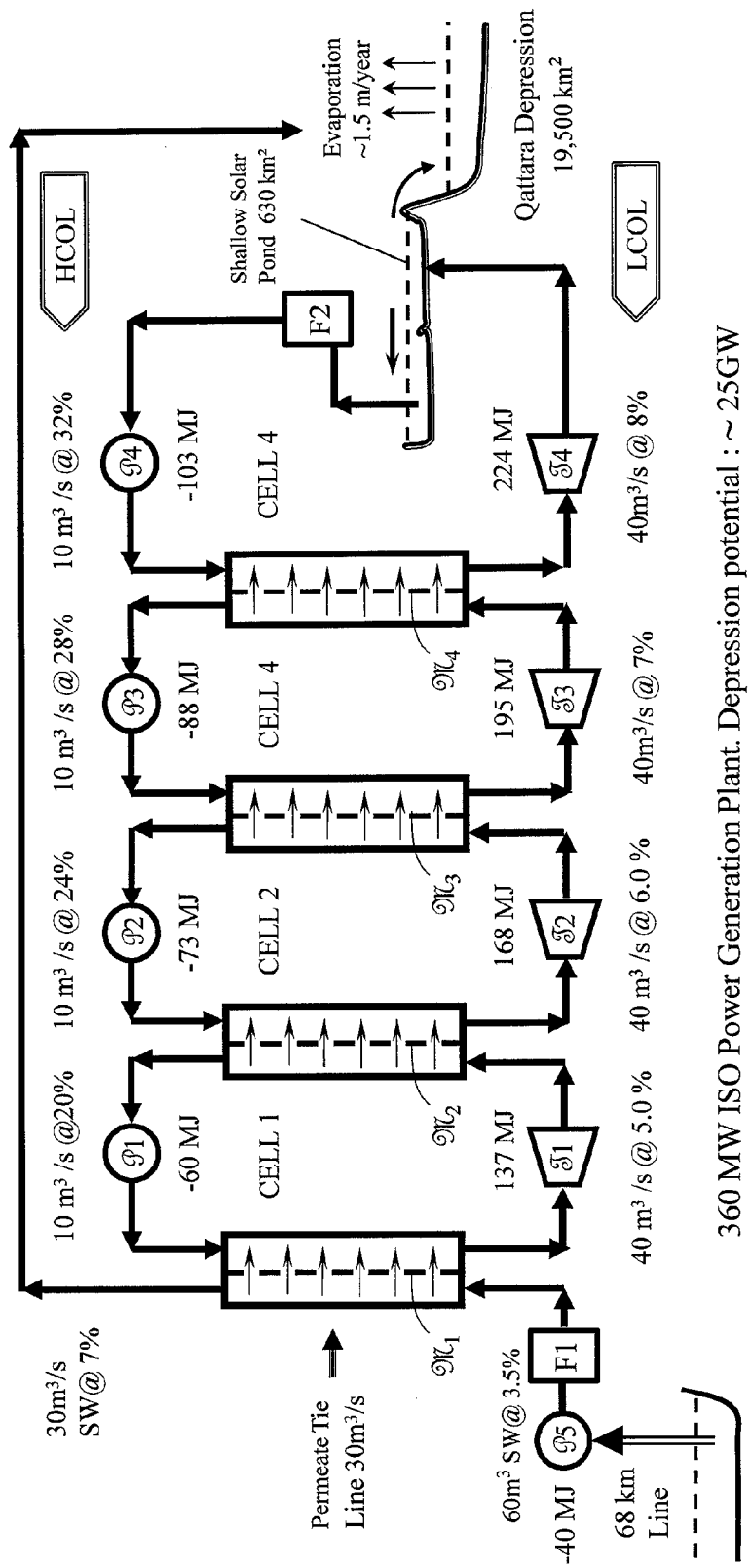

FIGS. 19A and 19B illustrate Induced Symbiotic Osmosis [ISO] of four (4) cells system for a dry salt lake to generate 360 MW of power, operating at a constant permeate flow across all cells with constant high brine salt concentration to low brine salt concentration ratio of 4.0.

Figure 20A:
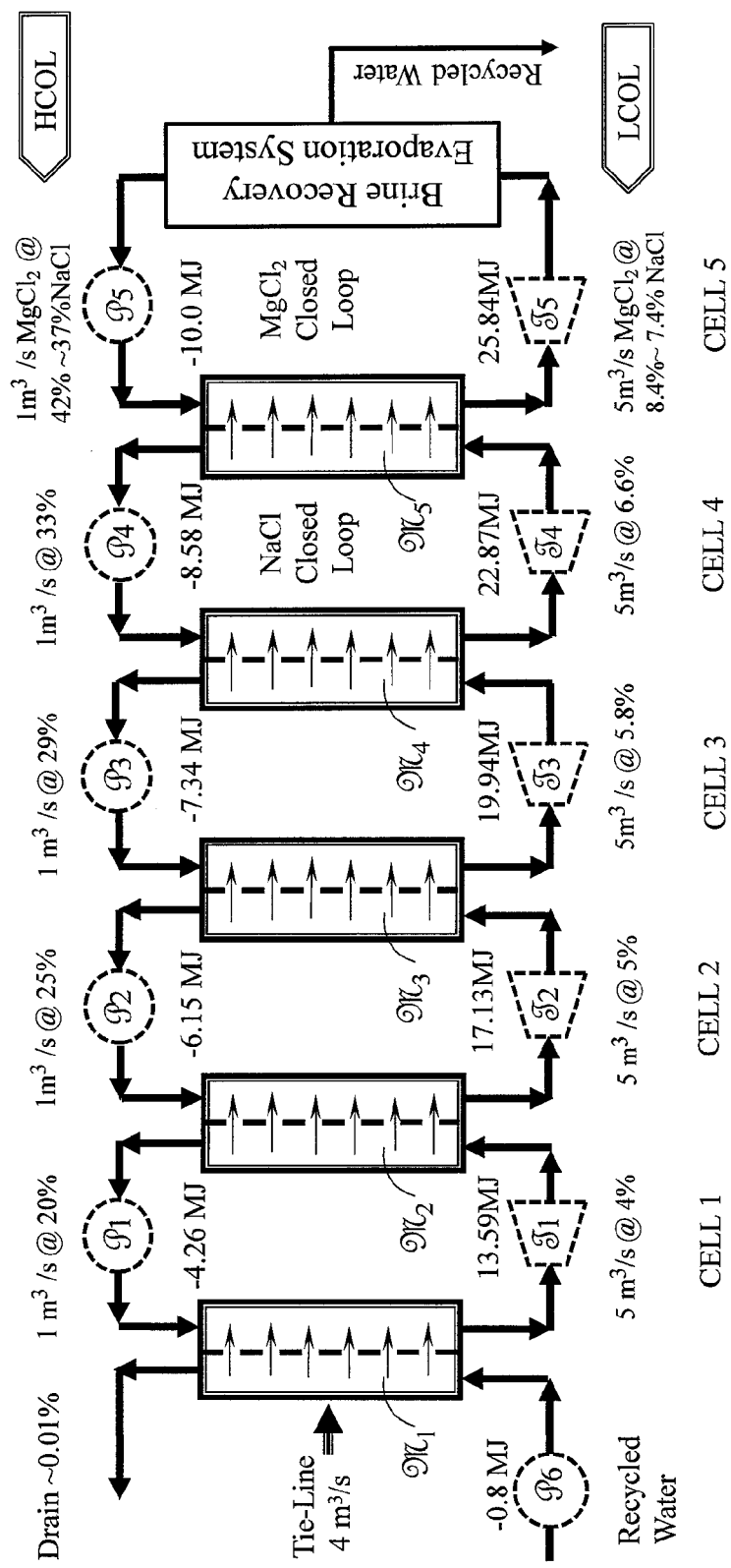

FIGS. 20A and 20B illustrate a closed Induced Symbiotic Osmosis [ISO] of Five (5) cells system employing two formulated brines, operating at a constant permeate flow across all cells with constant high brine salt concentration to low brine salt concentration ratio of 5.0.

Figure 22:
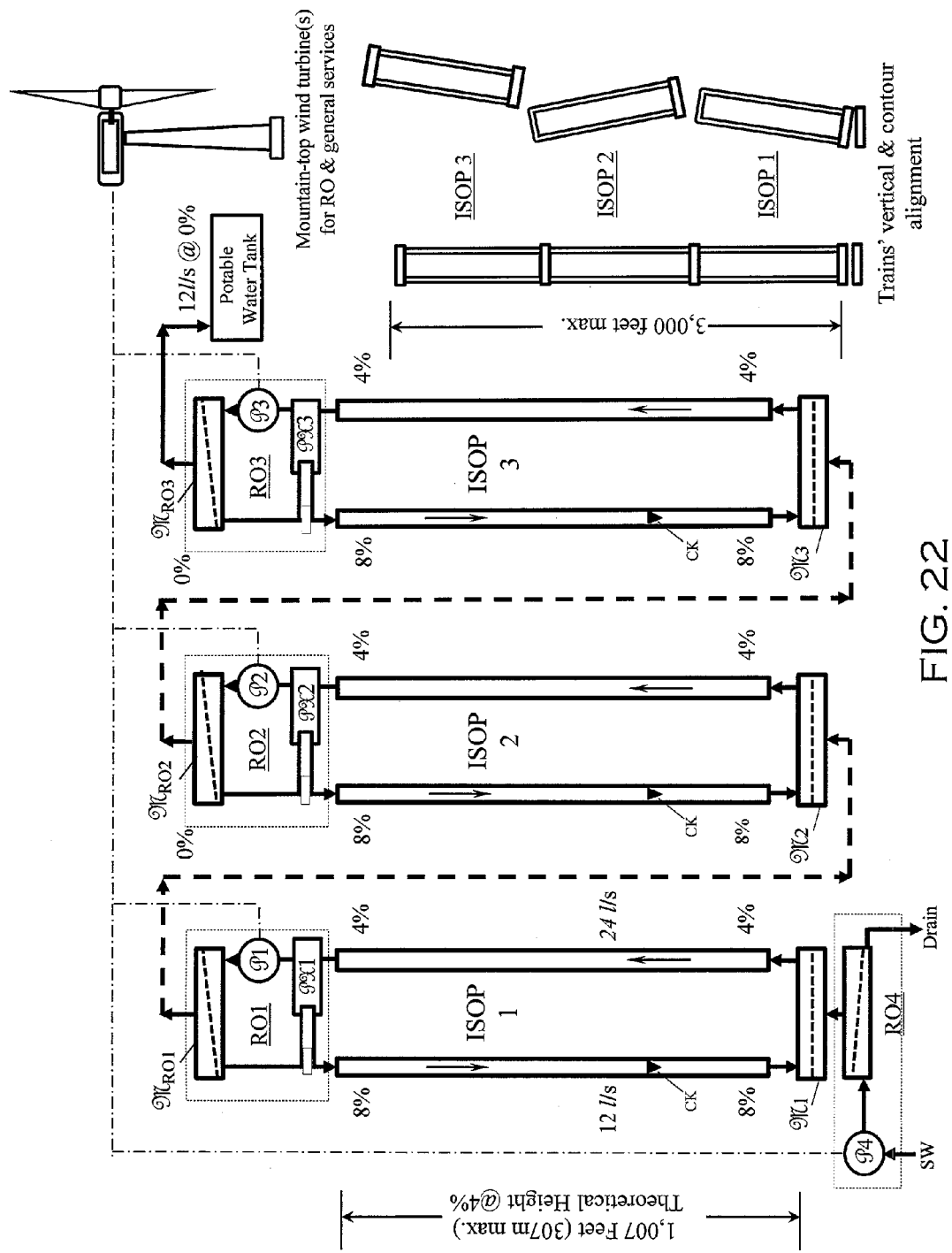
Figure 23:
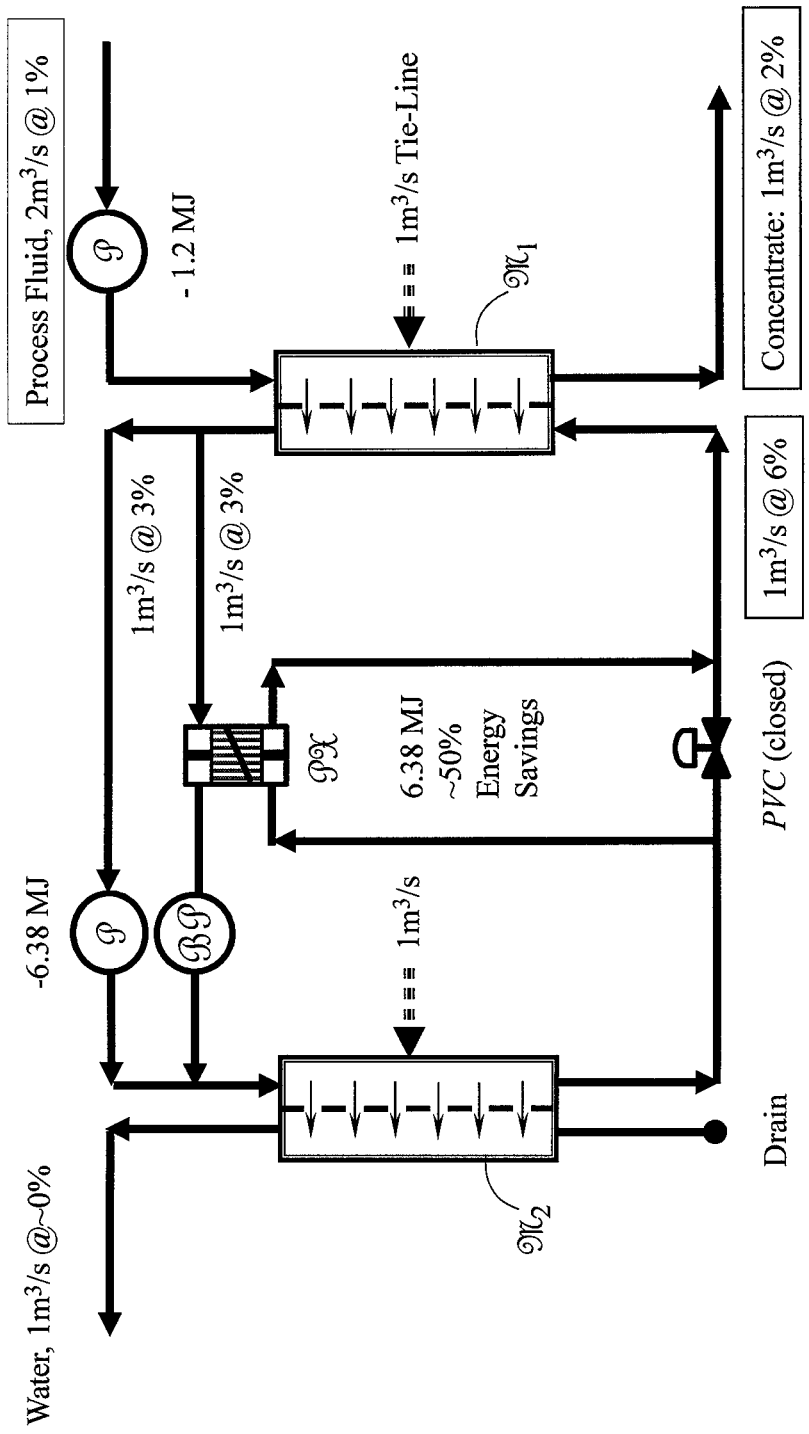

Group five comprises FIGS. 21, 22 and 23 illustrating novel ISO technology for non-power generating applications.

FIGS. 21A, 21B, 21C illustrate the principles of water head rise under the influence of osmosis.

FIG. 22 illustrates embodiment of Induced Symbiotic Osmosis Pump [ISOP], another different application of the ISO principals. In-lieu of generating power, the ISO process is used to elevate water to high altitudes of several hundred feet above sea level.

FIG. 23 illustrates embodiment of Induced Symbiotic Osmosis-Reverse Osmosis [ISO-RO], another different application of the ISO principals. In-lieu of generating power, the ISO process in a reversible mode of operation is used for water extraction and fluid concentration.

DETAILED DESCRIPTION OF THE INVENTION

In one embodiment, this patent application particularly pertains to the concept of a Large Scale Renewable Energy Technology (LSRE) for electric power generation employing the chemical potential dissimilarity of solutions, without dependence on conventional carbon-based or fission energy. The definition of a Large Scale Renewable Energy system, in this invention, implies generating electric power of at least 25,000 kWh, or providing electric power to a community of 25,000 people.

The proposed technology introduces rather new unique approach to recover energy from hyper saline waters and entitled "Induced Symbiotic Osmosis Process [ISO]". ISO comprises series of cells, each forming a closed hydraulic loop comprising pumping and power generation turbine, sharing semipermeable membranes between pre and post cells. Here, each cell is charged with brine of specified salt quantity and type, operated at progressively increasing concentration and osmotic pressure ratio, all cells in the series function simultaneously in symbiotic mode. Transport within cells is chemically driven under the influence of concentration potential field bounded by water of low salt concentration (LC) and by natural or manmade brine of high salt concentration (HC), thermodynamically approaching reversibility between cells.

This invention is rooted in the field of physics and pertains to the development of a chemical engineering conceptual process design, presenting new vision in the energy field. The inventor believes that understanding the basic physics and thermodynamics pertain to solutions and osmosis and their industrial application in this alternative green energy field have comprehensive value in appreciating this proposed technology. Therefore, it is the objective of the inventor to present his vision in concise, simple presentation and easy to follow explanation of the subject process, without entanglement in equipment and parts numbers. Further, all operating conditions and units of measurement and analyses are clearly defined and stated to avoid controversial opinions when relevant arts are examined. This application is rather large and it is the intention to describe it in logical steps starting with theoretical and mathematical background, substantiated with examples and analytical evaluation, then followed by several large scale potential applications of different complexity.

The first law of thermodynamics rules out the possibility of constructing a machine that can spontaneously create energy. However, it places no restrictions on the possibility of transferring energy from one form into another.

Internal energy (U) generalized differential form can be presented as:

$$dU=TdS-pdV+\mu dN+\phi dQ+vdp+\psi dm+ldA+ \quad \text{(Eq. 1)}$$

where, entropy S, volume V, amount of substance N, electric power Q, momentum p, mass m, area A, etc. are extensive properties and temperature T, pressure p, chemical potential $\mu$, electrical potential $\phi$, velocity v, gravitational potential $\psi$, surface tension l, etc. are energy-conjugated intensive quantities.

This generalized relation is reduced to account for osmotic effect as:

$$dU=TdS-pdV+\Sigma_i\mu_i dN_i \quad \text{(Eq. 2)}$$

$\mu_i$ is the chemical potential of the i-th chemical component, joules per mol.

$N_i$ (or $n_i$) is the number of particles (or moles) of the i-th chemical component.

In thermodynamics, the Gibbs free energy is a thermodynamic potential that measures the "useful" or process-initiating work obtainable from an isothermal, isobaric thermodynamic system. It is the maximum amount of non-expansion work that can be extracted from a closed system. This maximum can be attained only in a completely reversible process.

Gibbs free energy, $G_{(T,p,N)}$ attained in a reversible process can be presented in simplified form as: G=U+pV−TS. Expanding this relation in a differential form, with substitution of Eq. 2

$$dG=dU+d(pV)-d(TS)=TdS-pdV+\Sigma_i\mu_i dN_i+d(pV)-d(TS)=TdS-pdV+\Sigma_i\mu_i dN_i+pdV+Vdp-SdT-TdS \quad \text{(Eq. 3)}$$

By elimination of opposite sign terms, osmotic effect in terms of Gibbs free energy is:

$$dG=Vdp-SdT+\Sigma_i\mu_i dN_i \quad \text{(Eq. 4)}$$

Gibbs free energy when pressure and temperature are constant (dp=0 and dT=0), a condition for process reversibility, results in:

$$dG=\Sigma_i\mu_i dN_i \quad \text{(Eq. 5)}$$

At equilibrium, there is no change across the membrane, and then the change in Gibbs free energy is:

$$dG=0=dN(\mu_2-\mu_1) \text{ and } \mu_2=\mu_1 \quad \text{(Eq. 6)}$$

For most osmosis applications, temperature plays insignificant role and can be assumed negligible. However, pressure can still contribute to the system performance, then Gibbs free energy (Eq. 4) can be reduced to:

$$dG=Vdp+\Sigma_i\mu_i dN_i \quad \text{(Eq. 7)}$$

To define the relation between pressure and chemical potential, assume chemical potential in Eq. 6 is negligible, then dG=Vdp, but since pV=nRT, from perfect gas equation of state, by substitution, dG=nRT dp/p. By integration between $p_o$ and p gives:

$$\Delta G=G_p-G_{p_o}=nRT\int dp/p=nRT\ln(p/p_o).$$

For one mole (n=1) and in term of chemical potential given earlier by Eq. 5

$$\mu=\mu^\circ+RT\ln(p/p_o) \quad \text{(Eq. 8)}$$

In the case of an ideal solution, when both the solute and solvent obey Raoult's law (for closely related liquids, the ratio of the partial pressure of each component to its vapor pressure as a pure liquid is approximately equal to the mole fraction in the liquid mixture.

The superscript * denotes that the chemical potential refers to the pure substance). Eq. 8 can be rewritten as;

$$\mu_A=\mu_A^*+RT\ln X_w, p_A/p_A^*=X_w, \quad \text{(Eq. 9)}$$

Where, X is mole fraction

In case of real solution, the term '$X_A$' (the mole fraction) is replaced by a new term '$a_A$' (the activity of A), Then:

$$\mu_A=\mu_A^*+RT\ln a_A \quad \text{(Eq. 10)}$$

Similarly to the fugacity coefficient for real gases, the activity coefficient γ, is used for real liquids:

$$a_A = \gamma_A x_A \text{ and } \mu_A = \mu_A^* + RT \ln a_A = \mu_A^* + RT \ln \gamma_A x_A$$

Then, the chemical potential of the solvent may be written as:

$$\mu_A = \mu_A^* + RT \ln x_A + RT \ln \gamma_A \quad \text{(Eq. 11)}$$

In equilibrium, the chemical potential of the solvent, p, where the subscript w represents pure water in this invention is equal on both sides of the semi-permeable membrane:

In equilibrium $$\mu_w^{solvent} = \mu_w^{solution} \text{ or, } \mu_w = \mu_w^* \quad \text{(Eq. 12)}$$

Combining Eqs. 7, 11 and 12

$$\Delta p \cdot V_w = -[\ln a_w^{solution}] = -[RT \ln X_w + RT \ln \gamma_w]^{solution} \quad \text{(Eq. 13)}$$

For practical application, it is convenient to define a simplified mathematical relation to reflect the merits of rigorous thermodynamic functions. Here, since the composition of solution is composed of the molar fraction of water and the molar fraction of solute, or $$X_w + X_s = 1, X_s \ll 1, \text{ then } \ln X_w = \ln(1 - X_w) \approx -X_s$$

Assuming activity coefficient, $\gamma_w = 1$, and then equation 13 reduces to:

$$\pi = \Delta p \cdot V_w = RTX_s, \text{ but, } X_s = (n_s/V_{total})V_w = C_s V_w,$$

Then, osmotic pressure mathematical general form can be presented as:

$$\Delta \pi = \Delta p = RT\Delta C_s \quad \text{(Eq. 14)}$$

The osmotic pressure π was originally proposed by Nobel Laureate Van't Hoff and modified to include Staverman's osmotic reflection coefficient to become;

$$\pi = \Phi i c R T \quad \text{(Eq. 15)}$$

Where:
π=osmotic pressure or force imposed on the membrane given in bars, atm, psi, etc.
Φ=Osmotic Reflection Coefficient (NaCl=0.93, $CaCl^2$=0.86, Mg $CaCl^2$=0.89, etc.),
i=Ions concentration per dissociated solute molecule ($Na^+$ and $Cl^-$ ions=2),
c=molar concentration of the salt ions,
R=gas constant (0.08314472 liter·bar/(k·mol)),
T=ambient temperature in absolute Kelvin degrees (20° C.+273°=293° K).

In the case of sea water, the amount of average concentration of oceans salt is about 3.5% (35 gram/liter) mostly in the form of sodium chloride (NaCl). For simplicity of calculation, it is assumed that seawater contains 35 grams NaCl/liter. The atomic weight of sodium is 23 grams, and of chlorine is 35.5 grams, so the molecular weight of NaCl is 58.5 grams. The number of NaCl moles in seawater is 35/58.5=0.598 mol/liter and the osmotic pressure of seawater is $$\pi = [0.93][2][0.598 \text{ mol/liter}][0.08314 \text{ liter·bar/(k·mol)}][293 \text{ K}] = 27.11 \text{ bar}$$

Since one bar=100,000 Pascal (Pa) and one kilogram (force) per square centimeter ($kg_f/cm^2$)=98066.5 Pascal, computation of osmotic pressure, π and energy, $SW_E$, $LW_E$ can be presented in several forms:

$$\pi = [27.1 \times 10^5 \text{ Pa}]/[98066.5 \text{ Pa}/(kg_f/cm^2)] = 27.63 \text{ } kg_f/cm^2$$

$$\pi = [27.63 \text{ } kg_f/cm^2][m/100 \text{ cm}][1000 \text{ } cm^3/\text{liter}] = 276.3 \text{ } kg_f \cdot m/\text{liter}$$

$$SW_E = [276.3 \text{ } kg_f \cdot m/\text{liter}][9.80665 \text{ Joule}/kg_f \cdot m] = 2711 \text{ Joule/liter} = 2.711 \text{ MJ}/m^3 \quad \text{a.}$$

$$SW_E = [2711 \text{ Joule/liter}][1 \text{ cal}/4.184 \text{ J}][1 \text{ kcal}/1000 \text{ cal}] = 0.6479 \text{ kcal/liter} \quad \text{b.}$$

$$SW_E = [2711 \text{ Joule/liter}][1000 \text{ liter}/m^3] = 2.710 \text{ MJ}/m^3 = 0.751 \text{ kWh}/m^3 \quad \text{c.}$$

In case of generating power continuously (1 $m^3$ per sec, every second per day), which is the case with power generation systems, the theoretical potential power capacity of this system is:

$$[2.711 \text{ MJ}/m^3][1 \text{ } m^3/s][3600s] = 9.759 \times 10^9 \text{ J} = [9.759 \times 10^9 \text{ W·s}][h/3600 \text{ s}] = 2{,}711 \text{ kWh} \quad \text{d.}$$

$$SW_E = [2{,}711 \text{ kWh}][24 \text{ hrs/day}][365 \text{ days/year}] = 23.75 \times 10^6 \text{ kWh annually.} \quad \text{e.}$$

In the case of hyper saline lake such as the Great Salt Lake, the amount of average salt concentration is about 24% (240 gram/liter) mostly in the form of sodium chloride (NaCl). Lake water osmotic pressure is calculated as:

$$\pi = [0.93][2][4.1026 \text{ mol/liter}][0.08314 \text{ liter·bar/(k·mol)}] \cdot [293 \text{ K}] = 185.88 \text{ bar}$$

For continuous power generation at a rate of 1 $m^3$ per sec, the theoretical potential power capacity of the lake water (LW) of such system where; 1W=J/s, 1 W·s=J, 1 kWh=$3.6 \times 10^6$ J, then:

$$LW_E = [18.2286 \text{ MJ}/m^3][1 \text{ } m^3/s][3600 \text{ s}] = [65.623 \times 10^9 \text{ J}][1 \text{ kWh}/3.6 \times 10^6 \text{ J}] = 18{,}228.6 \text{ kWh}$$

$$LW_E = [18{,}228.6 \text{ kWh}][24 \text{ hrs/day}][365 \text{ days/year}] = 159.682 \times 10^6 \text{ kWh/year.}$$

For ISO membrane selection, several types of semipermeable membranes such as stirred cell membrane, flat sheet tangential flow membrane, tubular membrane, spiral-wound membrane and hollow fiber membrane can be used for the ISO technology applications. However, selection of a suitable membrane should be based on performance and economics. Hollow fiber allows a large membrane area per unit volume, which results in compact systems and generally more economical than other types of membrane design. Hollow fiber modules are available for brackish and seawater applications. Such membranes should operate above a minimum reject flow to minimize concentration polarization and maintain even flow distribution through the fiber bundle.

Concentration polarization results of accumulation of dissolved salt at the membrane suffice, creating relatively high localized osmotic gradient, reducing osmotically driven normal permeate diffusion and hinders membrane flux. Hollow fiber modules require feed water with lower concentration of suspended solids than the spiral wound module configuration. However, since ISO cells are charged with circulated brine of formulated salt content in closed loops, membranes are less susceptible to concentration polarization. Pretreatment is required for inlet water feed, particularly when organic fouling is anticipated. In general, membranes operating in induced osmosis mode are less susceptible to this phenomenon due to the low pressure imposed on membrane as compared with membranes in reverse osmosis service.

Regarding Induced Symbiotic Osmosis [ISO] membrane flux, the simplest equation describing the relationship between osmotic, hydraulic pressures and water flux, $J_w$ in this invention is based on calculating the log mean concentration difference, LMCD as one of the important criteria for realistic determination of equipment size and the cost of power generation process. LMCD has been calculated for all design cases since it is one of system efficiency parameters, particularly when energy regeneration efficiency is debatable.

$$J_w = AKp[\Phi\Delta\pi@\Delta C_{lm} - \Delta P]$$ (Eq. 16)

Where $J_w$ is water flux, Kp is the hydraulic permeability of the membrane, A is membrane area, $\Delta\pi$ is the difference in osmotic pressures on the two sides of the membrane, $\Delta P$ is the difference in hydrostatic pressure where negative values of $J_w$ indicating reverse osmotic flow. $\Phi$, reflective coefficient, $\Delta C_{lm}$ is log mean concentration difference (LMCD), calculated as shown in FIG. 8B.

This invention is a grassroots approach to a new trend in power generation. Drawings, figures and design tools are grouped based on contents in five groups:

I. ISO basic theory and related mathematical relations, FIG. 1-9.

II. Prior art for large scale osmosis energy generation, FIG. 10.

III. ISO design methodology and calculation, presented in this application as a text.

IV. ISO field of application, FIG. 11-20.

V. Novel ISO technology applications, FIG. 21-23.

I. ISO basic theory and related mathematical relations: The first group defines Induced Symbiotic Osmosis [ISO] basic theory, related mathematical relations and design criteria as outlined in FIGS. 1-9. FIG. 1 illustrates the phenomenon of reaching osmotic equilibrium when two solutions of dissimilar salt concentration are separated with a semipermeable membrane and as a result, one side of the apparatus can have a hydraulic head greater than the other side. More intriguing and perplexing to many of us that this process takes place spontaneously and without any external source of energy. This simple observation promoted the inventor to pursue means to harness this illusive force to maximize efficiency of osmotic power generators.

In details, the osmosis process for salinity power generation is rather simple and requires few unit operations; a semipermeable membrane module, means to flow dissimilar solutions along the opposite sides of the membrane, and means to recover the power generated by osmotically induced permeated water across said membrane. FIG. 2 illustrates two arrangements. Arrangement A, as depicted by FIG. 2A comprises the basic components for power generation by osmosis, as adopted by both the prior art and the ISO process of the subject application. The system comprising semi-permeable membrane; ℳ, pump; 𝒫, power generation turbine; 𝒯. Arrangement B, as depicted by FIG. 2B may also comprise a pressure exchanger; 𝒫𝒳, in addition to a booster pump; ℬ𝒫..

This basic osmosis equipment of FIG. 2 can be arranged in few configurations to meet specific objectives. FIG. 3 illustrates three segregated cases depicted by FIGS. 3A, 3B, 3C; each comprises the basic units described earlier for osmotic energy recovery. In FIG. 3A, seawater at a rate of 1 m³/s and 3.5% salt concentration (mostly sodium chloride) is pumped through one side of the membrane, while an equivalent amount of fresh water, FW with negligible amount of salt is pumped in a counter current mode along the opposite side of the membrane across from the seawater. By design, the membrane is rated to permeate water by osmosis from the fresh waterside to the seawater side at a rate of 1 m³/s. This means that the flow leaving the seawater side is at a rate of 2 m³/s, but now at half of the original concentration or 1.75%. The potential energy, as equated to the water head, of this stream is now higher than the potential energy of the seawater feed, where it is preferentially used to generate energy.

FIG. 3B, follows the same logic of FIG. 3A, but here it is assumed that the high salt concentration feed is a rejected stream from unrelated reverse osmosis process at 7% concentration. FIG. 3C is similar to FIG. 3B; except that the fresh water, FW is replaced here by the full flow of diluted seawater exiting the system of FIG. 3A, which is at a rate of 2 m³/s@1.75% salt.

Since the objective here is to generate power, each system must be analyzed based on equitable and technically sound criterion to determine validity of assumptions and merits of such processes. Therefore, several parameters and means of measurements are defined in the following:

Flow Nomenclatures, m: volumetric flow in m³, $Q_0$: Tie-Line permeate flow in m³/s, C: salt concentration %, Y: fresh water flow in m³/s, s: time in seconds, HC: high concentration %, LC: low concentration %, HCOL: cell high concentration operating line, LCOL: cell low concentration operating line, LMCD: log mean concentration difference, $\eta$ thermal efficiency, energy units are given in terms of MJ (Mega Joule) or kWh, FW: fresh water, LW: lake water, SW: seawater, SWS: seawater supply, SWR: seawater return.

Equipment Symbols: ℳ: ISO semipermeable membrane, 𝒫𝒳, : pressure exchanger, 𝒫, : pump, RO: reverse osmosis, 𝒯: hydraulic turbine.

Subscripts: 1, 2, 3, 4, to n: part numbers, i: inlet condition, o: outlet condition, 0: initial condition.

Specific gravity, SG is estimated at 20° C., using the inventor's following relation: [SG=1+0.0077×C %], where C is salt concentration in the form of sodium chloride, since saline waters contain mostly this salt.

Turbine Energy (MJ)=$(\eta)(\rho)(g)(h)(Q)$, where $\eta$: turbine efficiency (<1.0), $\rho$: density (kg/m³), g: acceleration of gravity (9.81 m/s²), h: water column height, head (m), Q: water or brine flow (m³/s), MJ: Mega Joule, Watt=Joule (J)/second.

Another simplified estimation is based on concentration, where turbine generated power equals [(0.658 MJ per 1% of concentration)(C %)(SG)(Q)], based on turbine hydraulic efficiency of 85% and where C, SG and Q are flow conditions at the turbine inlet.

Similarly, pumping requirement can be also based on concentration, where pump shaft energy equals [(1.033 MJ per 1% of concentration) (C %) (SG) (Q)], based on pump efficiency of 75% and where SG and Q are flow conditions at the outlet of the pump, but C is the concentration % at the inlet of the turbine, where pumping is intended to overcome the osmotic pressure leaving the membrane.

LC feed flow (FW, SW) transfer pumping requirement is 0.6 MJ (600 kW/m³·sec) at 60% efficiency and at 50 psi delivered pressure.

Since these analytical tools have been developed, estimation of generated and consumed energy of every case has been tabulated and shown as well on drawings in terms of Mega Joules. Cases of FIG. 3 can be now examined in depth. In FIG. 3A for seawater-freshwater system calculation indicates that the pumping requirement for this system exceeds the energy generated, implying this system is operating with a deficit in energy and is not economically viable technology. In FIG. 3B, 7% brine-freshwater system generated a net energy of 0.2 MJ at system efficiency of 4.3%. This implies a positive trend when freshwater vs. high concentrated brine is used. It is also worthy of observation that the logarithmic mean concentration difference, LMCD is twice the value of the other two systems. This is an indicator of higher flux, about twice, and obviously requires smaller membrane area at a lower cost.

In FIG. 3C, the brine side is maintained the same as in FIG. 3B at 7% salt concentration, but on the low concentration membrane side, diluted saline water was fed at a rate of 2 m³/s@1.75% salt, which is the flow leaving the system of FIG. 3A. The higher flow was intended to provide enough flow to maintain a permeate rate across the membrane at the original stated specification of 1 m³/s. Although both FIG. 3B and FIG. 3C function identically on the brine side, doubling the rate of the low concentration feed placed the system of FIG. 3B in a deficit energy mode. Energy analysis for FIG. 3 cases is presented in details in FIG. 3D.

Many literatures and articles discuss with great enthusiasm the hypothetical potential of generating 2.7 MW of power by just mixing 1 m³/s of river water and 1 m³/s of ocean water. Unfortunately, very few if any one at all has examined this scenario to validate its merits and evaluate the amount of generated and consumed energy and the cost to achieve such endeavor. The rate of 1 m³/s may appear to some as a small amount of water, but in fact the volume of water to be transported, treated to protect membranes and processed daily for energy generation amounts to 50,000,000 gallons per day just to recover very few percentage points of what is being claimed. Note: 2.7 MW is based on absolute temperature of 300° K (27° C.), which is an arbitrary number to simplify calculations.

Referring to FIG. 4, two attempts were made to rearrange the individual stages of FIG. 3, forming two dual stage systems; one system is using a step down approach forming a cascade system and is depicted in FIG. 4A and the other as stage coupling approach forming a loop, creating the concept of an the Induced Symbiotic Osmosis [ISO] system and is depicted in FIG. 4B. Here, the cascade system is formed by combining FIG. 3A and FIG. 3B, while the ISO system is formed by combining FIG. 3A and FIG. 3C of the same figure. Energy generation analysis for these two cases is presented in details in FIG. 4C.

Evaluating energy generation and consumption from both systems reveal few interesting results. The cascade system energy generation is 30% higher than the ISO system. For energy consumption, the cascade system is 50% higher than the ISO system, implying that the cascade system is operating with an energy deficit. The obvious reason for system's deficiency is the large additional fresh water required of 2 m³/s, which means that 3 m³/s of fresh water were required for every 1 m³/s of brine@7% salt concentration to maintain operating the a system at HC/LC of 2.0 (3.5% to 1.75%).

By comparison, the ISO system requires only 1 m³/s of fresh water for every 1 m³/s of brine@7.0% salt concentration. As important, the loop that was formed by coupling the standalone stages of FIG. 3, now is operating in a closed cycle, here is called CELL, allowing only permeated water to be transported spontaneously across its membrane boundaries without intermingling its salt content with its surroundings. The amount of fresh water that is used in this arrangement is half the amount of the combined flow of the two stand alone stages A and C of FIG. 3. As a result, this new arrangement achieves 0.7 MJ/m³ of brine with system efficiency of 10% compared with a negative net energy in both the cascade and the stand alone stages.

The closed cycle concept leads to startling observation that brine, seawater and fresh water salt contents reside only on the boundary of the closed loop without mixing with the loop content. In this case, each closed cell can be charged with formulated brine of specified salt quantity and type, cycling in a controlled concentration-pressure loop.

The osmosis phenomenon is reversible. As stated earlier, it is impossible to reach perfect reversibility; however, the system undergoing the changes may approach reversibility if it responds much faster to the applied change, particularly if it is temperature independent meaning isothermal process, which is the case in osmosis application.

The concept of the reversibility of the ISO Cycle is illustrated in FIG. 5 in comparison with a Carnot Cycle, hypothesized by Nicolas Leonard Sadi Carnot in 1824. If the cycle is acting as a heat engine to generate power using vapor heat cycle, as depicted in FIG. 5A, then it can be reversed to a refrigerator by replacing its turbine by a vapor compressor (com) and its liquid pump by an expansion valve (ev), as well as, reversing the flow direction in the cycle. In this case the condenser acts as refrigerator and the boiler acts as hot gas cooler.

Figure 5B:
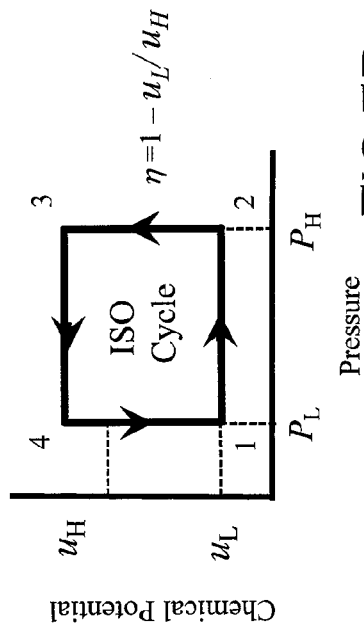

Thermodynamically, cyclic behavior of this process is presented in FIG. 5B, simulating a function of temperature and entropy. The efficiency of the Carnot cycle is given as a function of system's low temperature sink and it high temperature source such as:

$$\eta = 1 - T_L/T_H.$$

Figure 5C:
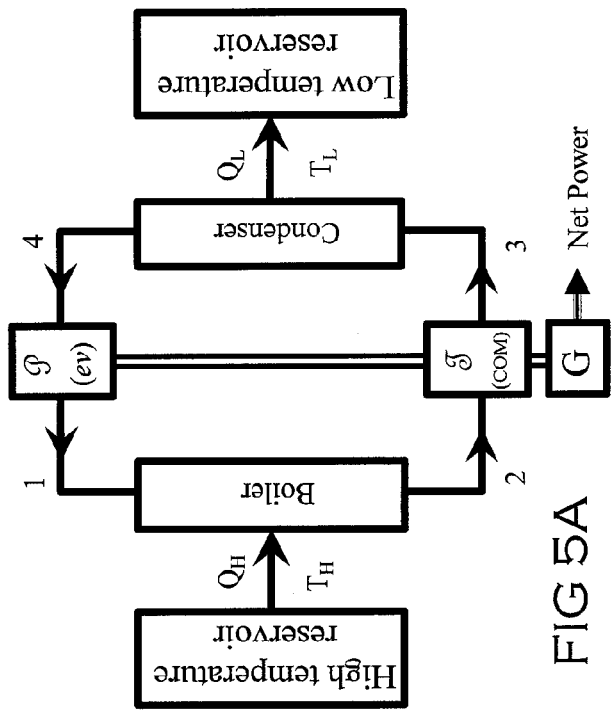

The applicant of this invention hypothesized that the ISO cycle is also a "Reversible Liquid Power Cycle" to generate power using chemical potential cycle, as depicted in FIG. 5C. It can be reversed to a desalination machine, if the osmotic pressure gradient between the ISO cell and the high salt concentration fluid (brine side) across its semipermeable membrane allows for reversing the permeate flow direction. This requirement can be accomplished in some applications by increasing the salt concentration within the cycle itself. In this case, the cell hydraulic turbine can be replaced by a back pressure control valve (pcv) or preferably with isobaric pressure exchanger to recover the pressure power of the recycled fluid leaving the pump and use it to boost the feed pressure to said pump. In describing reversibility, pumping pressure in the new arrangement exceeds the osmotic pressure of the solution within the cycle, resulting in diffusing water to the lower osmotic pressure outside the cycle (water side). In this case, the semipermeable membrane, $\mathfrak{M}_1$ now acts as a reverse osmosis membrane. However, transporting water outside the cycle will increase salt concentration within this cycle, lowering its chemical potential to a point that allows the inducement of water from the low chemical potential reservoir (fluid or brine side). As a result, the permeate flux changes it direction and takes a path from the high salt concentration fluid or brine side to the salt-free water side.

Practically, one single cell is adequate to achieve process reversibility for many applications. This process is suited for extracting water from brackish and drainage water streams and industrial wash water. More importantly, the reversible ISO cycle is an isothermal heatless process that neither decomposes, alters or destructs organic components nor producing disposable streams. It is an optimum means for concentrating fluids containing dissolved solids of commercial value such as juices, wines, pharmaceutical fluids, chemical fluids and reagents, sugar solutions, organic fluids, etc., while the recovered water is of quality suitable for recycling or reuse in other commercial and industrial purposes.

Figure 5D:
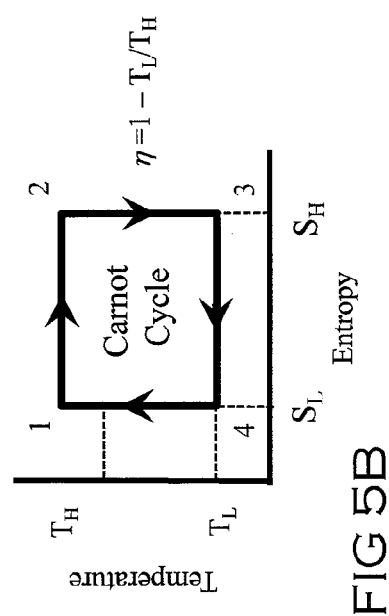

Thermodynamically, cyclic behavior of the ISO process is presented in FIG. 5D, simulating a relation between the fluid chemical potential and its hydraulic pressure. It is stipulated that the efficiency of the ISO cycle is given as a function of system low chemical potential sink and its high chemical potential source such as:

$$\eta = 1 - u_L/u_H.$$

The concept of ISO cell and the hypothesis of operating this cell in reversible mode seem to comply with thermodynamic principals of reversibility as defined in literature.

Therefore, the inventor of this work promotes the concept of an efficient new osmotic energy cycle to be named the "ISO Cycle", also the "Reversible Liquid Power Cycle", also named after the inventor's name as the "Kelada Cycle".

In FIG. 6 the concept of operating series of those ISO cells functioning in symbiotic pattern is presented and discussed. This figure illustrates the inventor's vision in developing the concept of an Induced Osmosis train comprising several segregated closed loop power cycles; Cell 1 to Cell n. Each cell contains saline solution, preferably sodium chloride of a specified concentration. Salt concentration in each cell follows a concentration progression profile defined by water feed salinity, flow conditions and the salinity differential ratio in each cell.

Symbiotic function of the induced osmosis train is possible, only if the ISO train is operating within a concentration potential field. This potential field is bounded by low salinity water (high chemical potential side), containing $C_0$ salt concentration, schematically presented in a light line, and high salinity water (low chemical potential side) containing salt concentration, schematically presented in a heavy line. Since these cells are closed loops, it is implied that no net water accumulation or depletion should take place in the cell. Therefore, induced water from an adjacent cell on one side must be accompanied by diffused water, of the same amount, to the adjacent cell on the opposite side. As a result, a constant flow of membrane permeate must cross each cell in the train, here is called "Tie-Line" flow. This Tie-Line is one of the system design parameter and will be discussed in more detail at a later point.

Further, the last cell in the train, Cell n is a power cycle operating in the highest concentration level in the train. However, this cycle is being considered closed or opened cycle, depending on availability of brine. For example, if brine and fresh water are recycled in a fully enclosed evaporative means integral to the ISO system, then Cell n is considered closed, otherwise Cell n is opened. This closed process could be achieved employing a contained water distillers to evaporate excess water from the rejected brine, then recycle collected high concentration brine and distilled water back to the system. In addition, Cell 1 to Cell n−1 are hypothesized to operate in a reversible mode, but claiming Cell n reversible or irreversible is subject of debate at this stage of development.

FIG. 7 is a further development of the inventor's vision of the Induced Osmosis train as outlined in FIG. 6. As defined earlier, the ISO train operates within a defined concentration potential field, but it must also operate according to other parameters. As in the case of concentration, there is progressing trend from Cell 1 to Cell n. So, there is also a progressing trend in osmotic pressure (π) and cells pumping pressure (P) in a pattern proportional to the concentration profile.

Certain operating conditions must be observed in each cell to allow the train to function as intended. It is critical that all cells cycle in the same pattern and in the same direction; counterclockwise or clockwise as dictated by the location of the pump and the turbine in the cell. Interruption of a segment of the train will halt the flow of the Tie-Line and stops the train. Therefore, the design of such system should provide spare membrane elements with proper means for isolation and startup. Another factor should be considered that traversing flows in the membrane should be in a countercurrent mode, with sufficient differential osmotic pressure across said membrane, otherwise membrane efficiency diminishes. In operating ISO membranes, one side of the membrane between the pump inlet and the turbine inlet experiences higher volumetric flow rate and pressure than the returned flow in the section of the loop between the turbine outlet and the pump inlet; turbine inlet flow>pump inlet flow and turbine inlet pressure>pump inlet pressure. As in the case of concentration of FIG. 6, this behavior was also schematically presented in a heavy line.

FIGS. 8A and 8B illustrate a simple mathematical model of flow and concentration for a four (4) cells ISO system. This model is intended to emphasize certain operating parameters:

1. The volumetric change between the flow leaving a cell membrane towards the cycle's turbine and the flow discharged from the cycle's pump equals to the amount of water induced across the membrane; here it is called Tie-Line. This Tie-Line is a constant flux or flow across every membrane in the ISO train. Taking for example Cell1, here $Q_{1o}-Q_{1i}=Q_o$ where $m_o$ is the Tie-Line, m³/s and is the same in every following cell.

2. Each cell has an operating concentration ratio proportional to the inverse of the volumetric inlet and outlet flow ratio of the said cell.

Considering Cell 1 as an example, here: $C_{1i}/C_{1o}=Q_{1o}/Q_{1i}$.

3. Cell concentration ratio may be specified as constant value along the train, preferably when the brine feed is set at a given volumetric rate; 1 m³/s.

4. Cell concentration ratio may be specified in progressively ascending value from one cell to the next, preferably when the permeated water (the Tie-Line) from the fresh water or seawater feed is set at a given volumetric rate; 1 m³/s.

5. Modeling the ISO process via mathematical relations requires clear definition of all the parameters involved in this process. Here, the ISO train comprises a series of cells operating within a global concentration potential field bounded by low salinity water, $LC_{train}$; seawater or water with negligible salt content, on one end of the train and high salinity water $HC_{train}$, on the other end of the train. Each cell within the train operates within a local concentration field, progressively ascending towards the train's high salinity boundary. The cell local concentration field is defined as $(HC/LC)_{cell}$ ratio. Cells' high and low fields of concentration form two virtual lines extending the length of the train and dictating cells' performance. The upper high concentration line is defined as HC Operating Line, or HCOL and the lower low concentration line is defined as LC Operating Line, or LCOL. The HCOL range is limited by the train salinity water boundary, while the LCOL range is limited by the mechanical integrity and performance of semipermeable membranes under high pressure. In FIG. 8A, the HCOL comprises the values (from right to left) $C_{4i}$, $C_{3i}$, $C_{2i}$ $C_{1i}$ and the lower LCOL comprises the values (from right to left) $C_{4o}$, $C_{3o}$, $C_{2o}$, $C_{1o}$.

6. Selection of concentration operating line for a given ISO system depends not only on ISO train configuration and process parameters but also on the chemical and physical consideration of the available brine. As an example selecting HCOL depends to a great degree on the concentration of brine in a given region and the solubility of the salt content of the brine. The Great Salt Lake has on the average salt content of about 24%, while Lake Natron in Tanzania has a salt content of 34%. In closed systems, magnesium chloride may improve ISO system power generation since its solubility is higher than sodium chloride. Other factors such as solution multiphase behavior such as hydrate formation, crystallization, etc., and environmental compatibility should be carefully evaluated in designing an ISO process.

7. The primary factor in selecting LCOL is the mechanical integrity and performance of semipermeable membrane under high pressure. Most membranes for reverse osmosis are operating below 10% salt concentration, equivalent to 75 atm operating pressure.

8. Since the traversing flows in the membrane should be in a countercurrent mode, evaluating Log Mean Concentration Difference, LMCD, as given in FIG. 8B, is a critical design parameter in evaluating system efficiency and its impact on the overall capital cost of the system.

In this application the inventor prefers to operate LCOL below 8% concentration. Higher values could be adopted when membrane technology that sustains higher pressure becomes available, although not highly recommended.

FIG. 9 is the last figure in the first group and briefly outlines an important mechanical design criterion of the ISO cells. As discussed, ISO cells are segregated and operate in closed loops. Each cell is charged preferably with only sodium chloride brine of specific concentration. Concentration of this brine varies according to the intended performance of each cell. FIG. 9 illustrates a schematic design of a three ISO Cells, where cell 1 and 2 are closed loops, but cell 3 is exposed to a large reservoir of high concentration brine and most likely operates as an open loop. In this scenario each of the closed loop cells should be provided by means to charge these cells with suitable brine for its function or to evacuate it, providing adequate surging capacity for each cell and means to control the flow as a function of its concentration. In this patent application, simple systems with few components are discussed, but in a large scale ISO plant with many ISO trains comprising hundreds of membrane elements and potentially millions of square meters of semipermeable membranes an elaborate operating system would be required.

It is also envisioned that the ISO train starts its operation from the last cell on the brine side first and progresses rather simultaneously towards the low concentration feed, the water side. In starting an ISO system, it is essential to establish a tie-Line flow as quickly as possible to avoid pumps shut down on low flow, which is a conventional safety provision in operating pumping systems. This condition suggests the use of variable drive pumps. A supervisory computer controlled scheme is required to manage the complex function of the multi-cell ISO system.

Desalinated water permeates semipermeable membranes under the influence of osmosis, without accumulation or depletion of cells' water and salt content. In essence, water migrates from one ISO cell to another, in symbiotic fashion at a constant flow, defined in this application as the "Tie-Line" flow. Permeate flow is technically referred to as membrane flux. Flux rate per unit area of membrane is dependent on the hydraulic permeability of the ISO membrane, as well as membrane logarithmic mean concentration difference, LMCD. These two parameters are of great importance that should be maximized, when possible, for favorable economical justification of ISO salinity power generation.

However, evaluation of ISO power generation capability is directly dependent on the differential osmotic pressure across the ISO membrane at its lower level, specifically at the outlet of the membrane. Salt differential concentration across the membrane, $\Delta C_\mathfrak{N}$ is proportional to osmotic pressure and therefore is being used in this ISO predictive model.

In summary, specifying the number of cells in a multi-cell ISO train is dependent on the following parameters:
1. Train concentration potential field, $\Delta C_{train}$.
2. Salt differential concentration across the membrane, $\Delta C_\mathfrak{N}$,
3. Cell differential concentration ratio, (HC/LC).
4. Permeate Tie-Line flow, TL, m³/s.
5. Low concentration operating line, LCOL.
6. High concentration operating line, HCOL.
7. Membrane mechanical integrity, MMI.
8. Membrane Log Mean Concentration Difference, LMCD.

9. Feed streams and cells content temperature, in degree absolute K.
10. Changes of heat of solution within each cell.
11. Membrane concentration polarization fouling.

Modeling criterion for an application that is based on the ISO process requires definition of operating parameters and a set of mathematical relations that accounts for multi-cell system, here are presented in the following:
1. $\Delta C_{train} = (HC-LC)_{train}$
2. Low Concentration Operating Line, LCOL: $[\Delta C_{\mathfrak{N}i} = (i)(\Delta C_{\mathfrak{N}1})]$, i=1, n
3.

High Concentration Operating Line, HCOL: $\left[\left(\frac{HC}{LC}\right)_i\right][LCOL_i]$, i = 1, $$n\left[\left(\frac{HC}{LC}\right)_1\right][LCOL_1], \left[\left(\frac{HC}{LC}\right)_2\right][LCOL_2], \ldots, \left[\left(\frac{HC}{LC}\right)_n\right][LCOL_n]$$

4. Pump volumetric flow, $Q_{gi}$, m³/s, Turbine volumetric flow, $Q_{\mathscr{B}i}$, m³/s $(Q_{\mathscr{B}i}/Q_{gi})=(HC/LC)_i$
5. Tie-Line, TL: $((Q_{gi} - Q_{\mathscr{B}i})$
6. Turbine energy, $E_{\mathscr{B}} = 0.658 \; \Sigma_{i=1}{}^n[(C_{\mathscr{B}i})(1+0.0077 \; C_{\mathscr{B}i})(Q_{\mathscr{B}i})]$, MJ
7. Pump energy, $E_g = \{1.033 \; \Sigma_{i=1}{}^n[(C_{gi})(1+0.0077 \; C_{gi})(Q_{gi})]+LC$ Feed transport$\}$, MJ
8. Net energy generation $\Delta\Sigma_{train} = E_{\mathscr{B}i} - E_{gi}$,
9. System efficiency, $\eta = \Delta\Sigma_{train}/E_{\mathscr{B}i}$ II. Prior art for large scale osmosis energy generation: In this group, related prior art that deals in large scale renewable energy generation by osmosis is reviewed in great detail to understand the merits of each work and its applicability.

FIG. 10 of this application illustrates FIG. 5 and FIG. 5a of U.S. Pat. No. 3,906,250 describing Pressure Retarded Osmosis, PRO to generate power from the Dead Sea. This work has both historical and conceptual value in studying salinity power. It is the first attempt to evaluate harnessing this power, as well as the first effort to consider this technology in a large scale application. It appears until this day that this patent is the only attempt to develop large scale energy generation system by osmosis.

The inventor of the present work appreciates the prior art, but takes exception to certain areas where contradictory or erroneous information were presented that might undermine the value of this work. Since the current ISO invention pertains to efficient salinity power generation, it was prudent to understand and evaluate early art, rather carefully and without bias to establish sound and definitive technical basis for the new technology.

In describing FIG. 4 of U.S. Pat. No. 3,906,250, Loeb explained his process of using PRO in column 7, line 5 to line 27:

"As one example, 1 cubic meter of Dead Sea brine ($\pi$=940 atm) at zero pressure gauge is compressed to a hydraulic pressure of 200 atmospheres (Point B) after which it is passed through the Pressure Retarded Osmosis, PRO apparatus 20, at this pressure in counter flow to the Jordan River water at zero hydraulic pressure on the other side of the membrane. (In the calculations on Dead Sea brine, it is assumed that the osmotic pressure-concentration relations will be the same as for magnesium chloride). Each cubic meter of Dead Sea brine receives 0.8 cubic meters of permeant at 200 atmospheres pressure (Point C) after which the diluted solution ($\pi$=515 atm) passes through the hydroturbine generator, where its hydraulic pressure is reduced to zero in delivering a net energy output for the 0.8 m³ of permeant, of 160 m³ atm (Areas ABCD in FIG. 4a). On the basis of one cubic meter of permeant 200 m³ atm or 5.6 KWH are delivered, i.e., the energy/permeant ratio is now 5.6 KWH/m³ permeate. As can be seen in FIG. 4 the effective driving force, (Δπ–P), at the Dead Sea Brine and Jordan River inlets of the PRO unit are 738 and 114.5 atmospheres respectively".

It is unfortunate that Loeb had assumed that the salt in the Dead Sea is in the form of magnesium chloride and the amount of this salt can develop osmotic pressure of 940 atm. In fact this stated pressure is about 4 times the actual osmotic pressure of the Dead Sea that was reported in literatures. Based on 1980 Dead Sea water contains about 30-35% salt, or about 9 times that of the seawater. Magnesium chloride represents about 51% of this amount with estimated osmotic pressure of about 225 atm. At this elevated osmotic pressure of 940 atm, the concentration of magnesium chloride is about 135% which is about two and half times the saturation point of this salt (543 gram/liter). Where, magnesium chloride solubility at stated osmotic pressure is:

$$\pi = 940 \text{ atm}(1.013 \text{ bar/atm}) = (0.89)(3)(C/95.21)$$
$$(0.083140)(303), C = 1348 \text{ grams/liter},$$

Dissolving this amount of salt is not possible. Based on the saturation point of magnesium chloride, its osmotic pressure @30° C. is only 380 atm. This erroneous value was carried out through this work and it is regrettable.

FIG. 10 of the present application is a copy of FIGS. 5 and 5a of U.S. Pat. No. 3,906,250. Loeb explained his process in column 8, line 8 to line 37:

"FIGS. 5 and 5a show a possible 3-stage unit. Each stage consists of one of the pressure-retarded osmosis apparatuses described above (these being designated 30, 40 and 50, respectively) and a hydroturbine (37, 47, and 57) at the output end of the higher osmotic pressure liquid pathway. A pump 36 at the inlet end of the first stage raises the hydraulic pressure of the high osmotic pressure liquid (e.g., Dead Sea Brine) to a very high/hydraulic pressure, for example 350 atmospheres. This pressure is reduced to about 200 atmospheres in hydroturbine 37 at the end of the first stage, and is inletted at this pressure into the second stage 40. The hydroturbine 47 at the outlet of the second stage drops by pressure further, for example to about 108 atmospheres, before the liquid is introduced into the third stage 50, dropping to 0 atmospheres at the outlet of hydroturbine 57 of the third stage. Thus, in each stage, water from the low osmotic pressure liquid permeates into the high osmotic pressure liquid, causing the latter to gain energy; while the hydraulic pressure of the high osmotic pressure liquid is very high at the first stage, and is successively lowered while energy is delivered by the respective hydroturbine. By this means, hydraulic pressures as high as 350 atmospheres may be utilized, and the final ratio of diluted to entering Dead Sea Brine may be about 2.2, as shown".

The assumption of Dead Sea brine osmotic pressure of 940 atmospheres appears to divert the design of the Dead Sea three stages power generation system from its intended objective. Pumping brine at 350 atmospheres (5145 psi) represents not only a serious design limitation for equipment intended for utility service, but also a flawed engineering concept since this high pumping pressure will run the system as a reverse osmosis machine to produce desalinated water and not generating power. The applicant of the present invention has estimated the efficiency of such system to be about 2% only.

II. ISO design methodology and calculation. In this group, ISO system design methodology and calculation are presented in two scenarios:

Scenario 1: Specified brine flow rate; 1 m³/s at constant (HC/LC)$_{cell}$ ratio.

Scenario 2: Specified permeate flow rate; 1 m³/s at progressively ascending (HC/LC)$_{cell}$ ratio.

As an example of the first scenario, assuming an ISO train with the following specification: LC feed is fresh water in abundance, with negligible salt, brine feed with 24% sodium chloride concentration at a rate of 1 m³/s, constant ΔC$_{ℜ}$ of 2%, constant (HC/LC)$_{cell}$ of 4.0, membrane mechanical integrity of 46 bar (675 psi), equivalent to the osmotic pressure of 6% salt solution. This scenario is applicable to several domains, in particular the Great Salt Lakes, Utah-U.S.A.

Solution is based on multi-cell modeling criterion given earlier:
1. ΔC$_{train}$=(HC–LC)$_{train}$=(24% brine–0% FW)=24%
2. LCOL range=MMI in terms of salt concentration–LC SW feed=6%–0%=6%.
   Number of cells, n=LCOL Range/ΔC$_{ℜ}$ =6/2=3 cells
3. Low Concentration Operating Line, LCOL: [ΔC$_{ℜi}$=i C$_{ℜ1}$], i=1 to n
   Given C$_{ℜ1}$=C$_{ℜ2}$=C$_{ℜ3}$=2%, Then,
   LCOL: Cell$_1$=2%, Cell$_2$=4%, and Cell$_3$=6%
4.

High Concentration Operating Line, HCOL: $\left[\left(\frac{HC}{LC}\right)_i\right][LCOL_i]$, $i = 1$ to $n\left[\left(\frac{HC}{LC}\right)_1\right][LCOL_1], \left[\left(\frac{HC}{LC}\right)_2\right]LCOL[2], \ldots, \left[\left(\frac{HC}{LC}\right)_n\right][LCOL_n]$ HCOL:Cell$_1$ = 4×2% = 8%, Cell$_2$ = 4×4% = 16%, Cell$_3$ = 4×6% = 24%, This implies that the premised condition of 24% brine can meet the requirement for 3 cells.
5. Pump volumetric flow, Q$_{ℊi}$=1 m³/s
6. Turbine Volumetric flow, Q$_{ℊi}$ : (Q$_{ℊi}$ /Q$_{ℊi}$)=(HC/LC)$_i$= 4, Q$_{ℊi}$=1 m³/s, then Q$_{ℊi}$=4 m³/s.
7. Tie-Line, TL=Q$_{ℊi}$ -Q$_{ℊi}$=4 m³/s–1 m³/s=3 m³/s
8. E$_ℊ$ =0.658 Σ$_{i=1}^n$[(C$_{ℊi}$ ) (1+0.0077 C$_{ℊi}$) (Q$_{ℊi}$ )]=0.658 [(2%) (1+0.0077(2%)) (4 m³/s)+(4%) (1+0.0077(4%)) (4 m³/s)]+ (6%) (1+0.0077(6%)) (4 m³/s)]=32.65 MJ
9. E$_ℊ$ =1.033 Σ$_{i=1}^n$[(C$_{ℊi}$) (1+0.0077 C$_{ℊi}$) (Q$_{ℊi}$)]+LC Feed Pumping Energy, 0.6 MJ/m³=1.033[(2%) (1+0.0077(8%)) (1 m³/s)+(4%) (1+0.0077(16%)) (1 m³/s)+(6%) (1+0.0077(24%)) (1 m³/s)]=14.18 MJ+[(3 m³/s) (0.6 MJ/m³)]=15.98 MJ
10. ΔΣ$_{train}$=E$_{ℊi}$ --E$_{ℊi}$ =32.65 MJ–15.98 MJ=16.67 MJ, efficiency, η=51%

In summary: an ISO train comprises three (3) cells operating at constant cell (HC/LC) ratio of 4.0 and differential concentration across membranes of 2%, employing 1 m³/s lake water containing 24% salt and 3 m³/s negligible salt river water is capable of producing a net energy of about 17,000 kWh.

As an example of the second scenario, assuming an ISO train with the following specification: LC feed is seawater in abundance, with 3.5% salt content, brine feed with 28% sodium chloride salt concentration. Permeate flow from seawater, Tie-Line (TL), is 1 m³/s, ΔC$_{ℜi}$ is progressively ascending (HC/LC)$_{cell}$ ratio of 3-4, Membrane mechanical integrity of 7% salt (membrane maximum osmotic pressure design at equivalent salt concentration of 7% salt limits membrane design operation above 54 bar (786 psi). This scenario is applicable to several domains, in particular the Dead Sea, Israel-Jordan.

Solution is based on multi-cell modeling criterion given earlier:
1. ΔC$_{train}$=(HC–LC)$_{train}$=(28% brine–3.5% SW)=24.5%.
2. LCOL range=MMI in terms of salt concentration–LC SW feed=7%–3.5%=3.5%.

This is a limited operating range for supporting no more than 2 cells.

Assuming $\Delta C_{\mathfrak{N}1} = 2\%$, and $\Delta C_{\mathfrak{N}2} = 1.5\%$. Then,
LCOL: $Cell_1 = 3.5\% + 2\% = 5.5\%$ and $Cell_2 = 5.5\% + 1.5\% = 7\%$ 3.

High Concentration Operating Line, HCOL: $\left[\left(\frac{HC}{LC}\right)_i\right][LCOL_i]$, $i = 1$ to $n\left[\left(\frac{HC}{LC}\right)_1\right][LCOL_1], \left[\left(\frac{HC}{LC}\right)_2\right][LCOL_2], \ldots, \left[\left(\frac{HC}{LC}\right)_n\right][LCOL_n]$ LCOL: 5.5% and 7% and progressively ascending cell $\left(\frac{HC}{LC}\right)$ ratio of 3-4.

HCOL: $Cell_1 = 3 \times 5.5\% = 16.5\%$, $Cell_2 = 4 \times 7\% = 28\%$

This implies that the premised conditions of seawater feed of 3.5% salt and brine with 28% brine can meet the requirement for 2 cells. In this example, both pump and turbine volumetric flows are unknown and needs to be defined using the Tie-Line and given cell $(HC/LC)_i$ ratio.

4. Pump volumetric flow, $Q_{\mathfrak{H}}$ and Turbine Volumetric flow, $Q_{\mathfrak{H}i}$.

5. Cell $(Q_{\mathfrak{H}} / Q_{\mathfrak{H}})_i$ ratio is proportional to cell $(HC/LC)_i$ ratio 6. Cell salt & volumetric balance: $(Q_{\mathfrak{H}i})] = Q_{\mathfrak{H}i} + TL, (C_{i\text{-}low})(Q_{\mathfrak{H}i}, + TL) = (C_{i\text{-}high})(Q_{\mathfrak{H}i})$   $Q_{\mathfrak{H}i}$, $m^3/s = (TL)(C_{i\text{-}low})/[(C_{i\text{-}high}) - (C_{i\text{-}low})]$ 7. Train flow:

$Cell_1$   $Q_{\mathfrak{H}1} = (1\ m^3/s)(0.055)/(0.165-0.055) = 0.5\ m^3/s$, $Q_{\mathfrak{H}1} = 1.5\ m^3/s$ $Cell_2$   $Q_{\mathfrak{H}2} = (1\ m^3/s)(0.07)/(0.28-0.07) = 0.333\ m^3/s$, $Q_{\mathfrak{H}2} = 1.333\ m^3/s$ 8. $E_{\mathfrak{H}} = 0.658\ \Sigma_{i=1}[([(C_{\mathfrak{H}i}))(1+0.0077C_{\mathfrak{H}i})((Q_{\mathfrak{H}i})]] = 0.658[(5.5\%)(1+0.0077(5.5\%))(1.5\ m^3/s)+(7\%)(1+0.0077(7\%))*(1.333\ m^3/s)] = 12.13$ MJ 9. $E_{\mathfrak{H}} = 1.033\ \Sigma_{i=1}{}^n[([(C_{\mathfrak{H}i}))(1+0.0077\ C_{\mathfrak{H}i})((Q_{\mathfrak{H}i})])+[LC$ Feed Pumping Energy, $0.6$ MJ/$m^3] = 1.033[(5.5\%)(1+0.0077(16.5\%))(0.5\ m^3/s)+(7\%)(1+0.0077(28\%))(0.333\ m^3/s)] = 6.19$ MJ$+[(2\ m^3/s)(0.6$ MJ/$m^3)] = 7.33$ MJ 10. $\Delta \Sigma_{train} = E_{\mathfrak{H}} - -E_{\mathfrak{H}i} = 12.13$ MJ$-7.33$ MJ$=4.8$ MJ, Efficiency, $\eta = 39.5\%$ In summary: an ISO train comprises two (2) cells operating at progressively ascending cell (HC/LC) ratio of 3-4 and differential concentration across membranes of 2%, employing 1 $m^3$/s desalinated water extracted from seawater containing 3.5% salt and just only 1/3 $m^3$/s, containing 28% salt lake water is capable of producing a net energy of 4.8 MJ, based on using one third of the flow that was used for the first example, or about 14.4 MJ (about 14,000 kWh), if a flow of 1 $m^3$/s of lake water is used.

IV. ISO field of application: In this group, the subject invention promotes the concept of Large Scale Renewable Energy (LSRE) for producing power anywhere natural or manmade physical domain or ecological topography allows for cycling of waters of dissimilar salt concentration, preferably via accumulation-evaporation of natural green resources. Application of the ISO process for salinity power generation encompasses many global hyper saline domains, extensive shorelines, and any locale where long sunny days are common event.

FIG. 11 tabulates some large hyper saline impoundments that are suggested for ISO applications. Most of these sources of saline water and its conjugate low salinity water, river or seawater, have the potential of producing hundreds of Megawatts of energy. As an example, the inventor of the subject ISO technology estimates that the Great Salt Lake-Utah, USA water domain has a net energy potential of about 500 MWh or $4.38 \times 10^9$ kWh per year, which appears sufficient for 500,000 household.

In this group, ISO application systems are categorized under three primary sub-groups.

The first sub-group comprises systems intended for natural water supplies of appreciable dissimilar salt content that already coexisting in close proximity. A typical such example is of a river water runs into an enclosed hyper saline lake, compensating lake water evaporation rate.

The first 10 scenarios of FIG. 11 are some examples of this sub-group, including the Great Salt Lake and its fresh water tributaries and the Dead Sea and its potential water supply of the Mediterranean or the Red Sea, Lake Assal, Djibouti and its low salt hot springs, Lake Natron, Tanzania and the Ngare Sero River, Lake Baskunchak, Russia and the Volga River and many other equivalent domains. Application of the ISO process in this sub-group is based on the condition that both low salt and high salt waters are accessible within common domain without the need for excessive energy means to prepare or condition influent streams to the ISO system. This condition implies less material and infrastructure, resulting not only in relatively economical system, but also an efficient one.

FIGS. 12-18 elaborating the application of the Induced Symbiotic Osmosis concept [ISO] as described in FIGS. 1-9, exemplifying power generation from several cases of FIG. 11.

FIGS. 12A, 12B and 12C illustrate a single stage scenario comprising a semi-permeable membrane and employing saline lake water feed containing 24% salt concentration (mostly sodium chloride) at a rate of 1 $m^3$/s. FIG. 12A is specified to induce 3 $m^3$/s permeate from river water containing negligible amount of salt. The HC/LC ratio in this case is 4.0. FIG. 12B is specified to induce 11 $m^3$/s permeate from river water containing negligible amount of salt of the same quality as in case FIG. 12A. The HC/LC ratio in this case is 12.0.

FIG. 12C illustrates summary of energy recovery calculations of systems of FIGS. 12A and 12.B, which appears to be comparable. However, the case of FIG. 12A seems to be superior to that of FIG. 12B for three reasons. 1) low membrane flux requirement, employing less membrane area, 2) Less fresh water to pump, requiring smaller pump and water transport system, 3) preservation of fresh water by reducing contamination with salt, resulting in 66% water saving.

FIGS. 13A and 14A illustrate an Induced Symbiotic Osmosis [ISO] employing saline lake water feed similar to that of FIGS. 12A and B, containing 24% salt concentration (mostly sodium chloride) at a rate of 1 $m^3$/s. Both cases in this scenario operate with constant high brine salt concentration to low brine salt concentration ratio within each cell, here is called HC/LC ratio. The case of FIG. 13A comprises six (6) cell-system operating at a constant permeate Tie-Line of 1 $m^3$/s across all cells, at cell HC/LC ratio of 2.0. The case of FIG. 14A comprises four (4) cells-system operating at a constant permeate Tie-Line of 2 $m^3$/s across all cells and at cell HC/LC ratio of 3.0.

FIG. 15 illustrates compiled power recovery data from the cases of FIGS. 13A and 14A and their respective power analyses. It is obvious from this comparison that the case of FIG. 14A is superior scenario for ISO power generation for several reasons, 1) the net energy generation per 1 $m^3$/s of the lake water is 16.64 MJ with a system efficiency of 40.2% compare to 8.73 MJ with system energy of 14.9% only as in the case of FIG. 13 A, 2) higher membrane flux due to its higher membrane LMCD, 3) requires less equipment, 4) lower final brine discharge concentration of 8% compare to 12% in the case of FIG. 13A, generating osmotic pressure that can be easily accommodated by current membrane design specifications. In general, operating ISO power generation system at high cell (HC/LC) ratio, if attainable, leads to positive net energy generation.

FIGS. 16A and 17A illustrate two Induced Symbiotic Osmosis [ISO] of three (3) cell-systems employing saline lake water feed containing also 24% salt concentration (mostly sodium chloride). The case of FIG. 16A operates at a constant Tie-Line of 1 $m^3$/s, but at progressively increasing cell (HC/LC) ratio from 2.0 to 4.0, coinciding with a decrease in brine rate. The case of FIG. 17A operates at a constant Tie-Line of 3 $m^3$/s and 1 $m^3$/s brine rate and at a cell (HC/LC) ratio of 4.0. The type system of FIG. 16A is suggested when the low concentration feed flow rate is given as specification for design.

FIG. 18 illustrates compiled power recovery data from cases of FIGS. 16A, and 17A respectively. The system of FIG. 16A has a comparable energy generation to the system of FIG. 17A based on 1 $m^3$ of brine, but at a relatively lower overall efficiency.

Comparison of FIG. 17A with the single stage of FIG. 12A, where both having identical flow conditions, clearly shows the dramatic improvement in power generation of about 150% and in the overall system efficiency of the ISO concept.

The second sub-group comprises systems that are also based on chemical potential of solution, however, are applicable when only low salinity water is available, particularly seawater. To formulate the necessary high concentration brine to run this ISO system, seawater is evaporated by means of a renewable source of energy such as solar or geothermal source to a suitable concentration to operate the ISO train, acting as the high concentration boundary, HC against a fresh supply of seawater acting as the low concentration boundary, LC. Systems of this group are relatively large-scale power generators, requiring large natural or manmade solar ponds and lakes for natural water evaporation. Such projects are most suitable for arid coastal regions of the world. Infrastructure of such project is a major undertaken, but in addition to its benefit in generating power, it has measurable effect on improving local atmospheric condition, sequestering carbon dioxide formation due plankton growth in the large body of water, potentially encouraging recreation and salt mining and promoting thriving communities around the shore of such lake.

A typical example of the second sub-group is the Qattara Depression-Egypt. FIGS. 19A and 19B elaborates the application of the Induced Symbiotic Osmosis concept [ISO] as described in FIGS. 6-9 for power generation from future development of dry salt lakes and any large land depression below sea level. This also include natural domains such as the Aral Sea, Kazakhstan, Badwater Basin-Death Valley, USA and Chott el Djerid, Tunisia, Chott Melrhir, Algeria or manmade ponds and abandoned mining sites worldwide, specifically arid areas in proximity to coastal waters.

FIGS. 19A, 19B illustrate a 360 MW Induced Symbiotic Osmosis [ISO] using four (4) cells-system intended for the 19,500 $km^2$ Qattara Depression-Egypt. The Seawater flow to the system is estimated at 60 $m^3$/s. Here the ISO system operates at a brine rate of 10 $m^3$/s with a constant Tie-Line of 30 $m^3$/s and at constant cell HC/LC ratio of 4.0. The solar pond, an area of a shallow depth at the perimeter of the depression, is developed and sized to evaporate 30 $m^3$/s from the rejected brine (40 $m^3$/s). This flow represents the induced water (the Tie-line) extracted from the seawater supply and being permeated through the ISO train. Rejected flow from the first cell at 7% concentration and a rate of 30 $m^3$/s is disposed directly into the depression. At estimated evaporation rate of about 1.5 m/year, the solar pond area equals (30 $m^3$/s) (3600 s/hr) (24 hr/d) (365 d/y)/[(1.5 m/y)(1000000 $m^2$/$km^2$)]=630 $km^2$. This represents 3.2% of the basin that could be eventually developed for power generation. ISO energy generation potential, if the depression is fully engaged, is 25 GW.

The simulation results of FIG. 19A are compiled in FIG. 19B. The system requires four cells operating with relatively lower LMCD membranes, but at relatively low seawater feed and less additional solar pond area. It is rated at 360 MJ with recovery efficiency of 49.7%, LMCD of 3.0 with exceptional net energy of 36 MJ per 1 $m^3$ HC brine or net energy of 12 MJ per 1 $m^3$ permeate.

The third sub-group systems are also based on chemical potential of solution, but are of the closed type, where space and water supply availability do not allow for open surface natural evaporation. In this case, closed evaporation means are required. All cells of such systems are charged with formulated brine including the last cell in the train. Closed solar or waste heat distillation means is used to concentrate the diluted brine exiting the last cell of the train and recycle both the concentrated solution and the condensed evaporated water back to the system. Except for the initial amount of water for charging the system, the demand for distilled water is rather limited. Systems of this sub-group are small-scale for less than 100 MW, requiring conventional parabolic solar collectors or waste energy stream and a multi-stage evaporator. These systems are most suitable for small communities anywhere solar insulation is sufficient to operate such systems efficiently. These systems are most suitable for small communities anywhere solar insulation is sufficient to operate such system efficiently.

The third sub-group application is of significant importance for the development of inhabitable communities in arid coastal regions of the world, by providing in-situ means for potable water and electrical power. Induced Symbiotic Osmosis, as described earlier, coupled with solar and wind energy, to process seawater and brine solutions would provide, not only electrical power, but also a primary supply of water to support all municipal and agriculture functions for small communities (25,000-50,000), relying only on seawater, sun and wind.

The power generation component of this scheme employs closed, self-sustained Induced Symbiotic Osmosis [ISO] systems, using only chemicals that is originally extracted from the sea; sodium chloride, magnesium chloride, etc.

FIG. 20A illustrates a closed Induced Symbiotic Osmosis [ISO] of Five (5) cells system employing two formulated brines. Four cells are charged with sodium chloride and the last cell is charged with magnesium chloride. The system operates at constant HC/LC ratio of 5.0, requiring permeate rate of 4 $m^3$/s for every 1 $m^3$/s of brine. Cell 5 contains 42% magnesium chloride equivalent to 37% sodium chloride. In this scenario, brine rate is set at 1 $m^3$/s, which in turns determines the permeate rate of 4 $m^3$/s. Cell 5 is a closed loop connected to a Solar Multi-Stage Flasher plant (SMSF), of conventional design. SMSF comprises parabolic solar panel to heat brine preferably above 150° C., multi-stage flasher to evaporate, condense, and exchange heat of flashed water vapor, and regeneration-formulation brine storage of and means (94) to recycle distillated water to Cell 1. The brine storage and the desalinated water tank are of adequate capacity to allow for operating the ISO power plant continuously for few days in case of interruption of brine or water recovery systems.

Energy recovery analysis of systems of FIG. 20B indicates that the system of FIG. 20A is capable of generating 62.6 MJ per 1 m$^3$/s of brine at 62.6% efficiency. This is unimaginable value in the field of alternative energy! Net energy exceeds 15 MJ/m$^3$ of permeate. This energy amounts to 548×10$^6$ kWh per year. Based on estimated annual household energy consumption per capita of 6,000 kWh in addition of 4,000 kWh for municipal and public works per capita, this system is capable of providing energy to a community of 55,000 people.

V. Novel ISO technology applications: In this group, Induced Symbiotic Osmosis [ISO] process can be also utilized in non-power generation functions such as elevating water to great altitudes, acting as an efficient high head pumping system, or operate as a concentrator of fluids and a reverse osmosis water recovery machine. Consequently, application of ISO is not limited to direct electric power generation and it may prove to be an important process unit operation for other applications in the future.

In reference to FIG. 1, water migrates from low salt content solution to the high salt content solution, via a semipermeable, spontaneously without any external force. As a result it creates a hydraulic head equivalent to the difference in osmotic pressure across the said membrane.

FIG. 21A, 21B and 21C exemplify this behavior and describes three cases. In FIG. 21A, a relatively short transparent pipe ends with a semipermeable membrane with a shutter isolation means at its bottom, is placed in a transparent container. Distilled water is poured into the container and 2% sodium chloride brine is poured into the pipe, to the same marked height on the pipe and the container. Quickly, the membrane's shutter is opened allowing water to flow across the membrane. Water level in the pipe starts rising, building a hydraulic head, while water in the container keeps dropping. Finally water transfer stops when the water in the container is no longer covers the membrane. Since the container runs out of water before knowing that the process has reached equilibrium, it is hypothesized that the brine has much higher osmotic pressure than the pressure formed by the hydraulic head at the bottom of the pipe. Therefore it is assumed that $\Delta\pi > \Delta P$.

FIG. 21B is a further development of FIG. 21A. In this case a relatively long vertical pipe about 165 meters with an open top and a semipermeable membrane with shutter isolation means at its bottom as in FIG. 21A, is placed in a transparent container. The pipe is filled with 2% sodium chloride brine while the container is kept empty. In this case, the osmotic pressure is 15.49 bars, which is lower than the hydraulic pressure caused by the solution head in the pipe (P>π). For simplification of illustration, it is assumed that the content of the pipe is maintained well mixed and the change in its concentration due to water diffusion is negligible. Quickly, the membrane's shutter is opened allowing water to flow across the membrane. Since P>π, water tends to diffuse out the membrane, here is called reverse osmosis, into the container. Since the diffused water into the container through the membrane is essentially salt-free with relatively high chemical potential higher than the brine, it may tend to permeate back through the membrane, until an equilibrium is reached between the hydraulic pressure in the pipe and brine's osmotic pressure (P=π). FIG. 21C is further development of FIG. 21B where a very long vertical pipe of about 320 meter is filled with 4% brine, with osmotic pressure of 31 bars @ 20° C. This pressure equates to a column of water of about 307 meter or 1007 feet (corrected for density), which is lower than the hydraulic pressure in the pipe (P>π). For simplification of illustration, it is assumed that the content of the pipe is maintained well mixed and the change in its concentration due to water diffusion is negligible. Quickly, the membrane's shutter is opened allowing water to flow across the membrane into the container until equilibrium is reached between the hydraulic pressure in the pipe and brine's osmotic pressure (P=π).

This phenomenon is further explored with a realistic system to transport water atop of high altitude of natural or manmade formations and structures.

FIG. 22 illustrates the concept of the Induced Symbiotic Osmosis Pump [ISO-P or ISOP] to transport water to the top of a Sea Cliff or Mountain Top several thousand feet above sea level. This is an example of a small 12 liter/s desalinated water system to support potentially 2500-4000 vacationers and inhabitants of resort community, lighthouse and the like, atop a cliff, 3000 ft above sea level.

The said figure comprises three ISOP cells 1, 2, and 3. Each [ISOP] forms an ISO closed loop with a riser pipe and a downpipe for brine circulation. Each loop is fully pre-charged with formulated brine of specific concentration midway between HC and LC brines. Pipe length is about 300 meter long (1000 feet) based on the theoretical value @ 4% brine concentration. The cross section of the riser pipe and the downpipe are sized to minimize dynamic frictional pressure drop. Generally, piping cross sectional area is proportional to the inverse of the downpipe to the riser pipe concentration ratio (HC/LC). Smaller size riser pipe results in higher flow velocity and consequently excessive dynamic pressure drop. The downpipe has a check valve (CK) to prevent backflow in this pipe and maintains one-way flow direction within the closed loop. The riser pipe and the downpipe can be constructed individually as separate piping system, as shown, or as a concentric piping system or combination of both depending on installation restrictions.

Each loop comprises an induced osmosis semipermeable membrane ($\mathfrak{M}1$, $\mathfrak{M}2$ and $\mathfrak{M}3$)) at the base of each ISOP cell. A reverse osmosis module (RO1, RO2 and RO3) is installed at the top of each ISOP to desalinate the brine and produce desalinated water that is required by the next ISOP. ISOP 1 has also, at its base a reverse osmosis module (RO4) to desalinate seawater and produce essentially salt-free water to operate said ISOP. These ISOPs are lined up in an upward direction to reach the intended height; 3000 feet in this case. Desalinated water leaving the last train; ISOP 3 is collected in a storage tank for distribution. Each reverse osmosis system comprises a semipermeable membrane (($\mathfrak{M}_{RO1}$, $\mathfrak{M}_{RO2}$ and $\mathfrak{M}_{RO3}$), brine pumping and pressure exchanger means ($\mathscr{P}1\&\mathscr{P}\mathscr{X}1$, $\mathscr{P}2\&\mathscr{P}\mathscr{X}2$, $\mathscr{P}3\&\mathscr{P}\mathscr{X}3$) all of which are operated remotely with electrical power generated by a conventional wind turbine. At such elevation, wind speed is relatively higher and more stable than at sea level, consequently more efficient.

The process concept here is the same as discussed earlier. Each ISOP operates with constant cell (HC/LC) ratio of 2.0 (8%-4%) with 12 liter/s permeate Tie-Line. Unlike prior ISO applications, availability of high salt solutions or means to recover it is not available at these altitudes; therefore reverse osmosis is being considered. However, since reverse and induced osmosis processes are limited by their membranes' mechanical integrity, brine solution concentration in all trains is kept at a maximum of 8%.

The driving force of flow in this system is primarily the salt concentration difference between the downpipe and the riser pipe, in addition to a slight contribution of the higher water density in the down pipe. The induced water through the osmosis membrane (($\mathcal{M}$ 1-($\mathcal{M}$ 3)) dilutes the brine from 8% to 4%, doubling the diluted brine. The osmotic pressure at 4% salt is estimated at 20° C. to be 31 bars. Pipe length would change based on concentration differential.

ISOP's piping system should be designed to accommodate such pressure, particularly at the lower end of the train; U.S. standard schedule piping 300 or better. In case of fresh water availability in mountain range from springs, snowmelt or tributaries, inlet RO of the first loop can be eliminated. ISO high altitude pumping system can be configured to accommodate higher and lower elevations and can be formed of more than one cell per ISOP, operating at progressively increase concentration, employing high concentration and low concentration operating line; (2%-1%), (4%-2%), (6%-3%), and (8%-4%).

FIG. 23 illustrates an Induced Symbiotic Osmosis cycle operating in reversible mode, acting as a reverse osmosis machine, here is called Induced Symbiotic Osmosis-Reverse Osmosis [ISO-RO], rather than an induced osmosis power generator.

This ISO-RO process is suited for extracting water from natural running water or wastewater streams with low salt content of about 10,000 part per million (1%), such as well brackish water, irrigation drainage water, industrial wash water, etc. More importantly, the reversible ISO cycle is an isothermal heatless process that neither decomposes, alters, or destructs organic components nor produces disposable streams. It is an optimum means for concentrating fluids containing dissolved solids of commercial value such as juices, wines, pharmaceutical fluids, chemical fluids and reagents, sugar solutions, organic fluids, etc.

ISO-RO has dual action. While water is being extracted from the process fluid by the high osmotic pressure of the cell brine, water is simultaneously displaced from the cell brine, by the cell, in-situ reverse osmosis action, producing desalinated water for recycling or reuse for other commercial purposes.

FIG. 23 comprises one ISO cell forming a closed hydraulic loop configured of specified volumetric and flow capacity for a specified permeate flux, having pumping means, a back pressure control means (pcv) or preferably a pressure power recovery means, replacing the original cell hydro-power generator turbine.

In FIG. 23, the pumping pressure in the new arrangement exceeds the osmotic pressure of the formulated salt solution within the cell, resulting in diffusing water outside the cell loop towards the lower osmotic pressure water side. In this case, the semipermeable membrane, $\mathcal{M}$ 2 acts as a reverse osmosis membrane. Spontaneously, transporting water outside the cell will increase salt concentration within this cell, lowering its chemical potential to a point that allows the inducement of water to the cell from the process fluid side across membrane $\mathcal{M}$ 1. In this case, membrane $\mathcal{M}$ 1 is acting now as an induced osmosis membrane.

In this process the permeate flux changes its direction and takes a path from the process fluid or brine side to the salt-free water side. To insure process reversibility, the osmotic pressure gradient between the formulated salt solution in the ISO cell and the process fluid across its semipermeable membrane must allow for reversing the permeate flow (Tie-Line) direction. Therefore, the ISO cell chemical potential must be lower (higher osmotic pressure) than the chemical potential of fluids across the cell boundaries. This requirement can be accomplished in some applications by increasing the salt concentration within the cell loop itself. However, mechanical integrity of the reverse osmosis membrane $\mathcal{M}$ 2 must be taken into consideration in determining salt concentration and related osmotic pressure of ISO-RO cell Each Induced Symbiotic Osmosis-Reverse Osmosis [ISO-RO] cell comprises two semipermeable membranes $\mathcal{M}$ 1 and $\mathcal{M}$ 2, primary pumping means ($\mathcal{P}$) with discharge pressure exceeding the osmotic pressure of the formulated fluid within the cell closed loop and a pressure controlling means to maintain the pressure required to sustain the reverse osmosis function. The flow existing said pressure controlling means must be at the lowest pressure possible, preferably atmospheric pressure, to enhance inducement of water from the process fluid across the semipermeable membrane $\mathcal{M}$ 1. It is prudent to consider other means to recover the residual pressure in this stream and employ it to reduce the overall pumping requirements of the reverse osmosis embodiment. Therefore, it is recommended that an additional pressure recovery and boosting means be provided in parallel to the primary loop pumping means ($\mathcal{P}$), where the cell circulating flow existing membrane $\mathcal{M}$ 1 is split between these two pumping systems.

The said pressure recovery and boosting means comprises a high efficiency isobaric pressure exchanger ($\mathcal{PX}$) of the type manufactured by Energy Recovery Inc. or any other equivalent conventional device, where it is followed by booster pumping means ($\mathcal{BP}$) to bring the system discharge pressure to the same level of the primary loop pump ($\mathcal{P}$).

In the example illustrated in FIG. 23, a process fluid at a rate of 2 m$^3$/s contains mineral salts with osmotic pressure equivalent to 10,000 part per million (1%) sodium chloride is concentrated to the equivalence of 2% sodium chloride salt, by extracting 50% of its water content or about 1 m$^3$/s. An ISO-RO cycle operating at cell HC/LC ratio of 2, with a maximum cell sodium chloride salt concentration of 6% is used. The induced flow of 1 m$^3$/s from the process fluid water dilutes the cell loop concentration from 6% to 3%, while doubling its flow rate. If a single pumping means is provided to accomplish the reverse osmosis function, 13.76 MJ of energy is required for every 1 m$^3$ of permeate. In case of replacing the cell loop pressure controller with a pressure exchanger, as depicted in FIG. 23, the recovered energy from the flow exiting membrane $\mathcal{M}$ $_2$, represents about 50% of the total energy that is required to operate the reverse osmosis embodiment. Consequently, the estimated net overall cell power requirement is only 2.3 kWh to concentrate 2 m$^3$ by 50% and to recover 1 m$^3$ of desalinated water.

Application of ISO-RO for concentrating solution of water-soluble organic compounds seems to offer an exciting and promising new technology in the food and beverages industry and in the field of organic chemistry and related pharmaceutical industry. Many of these compounds have relatively low osmotic pressure, which makes their concentration with the ISO-RO efficient and economical. Since the process is isothermal and heatless, quality of concentrated solution is intact. Further, the capability of the system to recover water in desalinated quality and recycles it without disposal of waste fluids highlights both the economical and the environmental merits of this technology. As an example, if a solution contains sucrose as in the case of sugarcane juice, concentration could be accomplished to a greater degree, simply because the osmotic pressure of sucrose is less than 10% of that of sodium chloride. This implies that the ISO-RO system of FIG. 23 can reduce the volume of 1 m$^3$ sugarcane juice containing 1% sucrose (10 kg sugar) by 95%, to a concentration of more than 20% sugar (equivalent to 2% sodium chloride), in addition of recovering about 0.95 m$^3$ of desalinated water, using less than 2.5 kWh of energy.

The present invention may be subject to many modifications and changes without departing from the spirit or essential characteristics thereof. The present embodiment should therefore be considered in all respects as illustrative and not restrictive of the scope of the subject invention as defined by the appended claims.

The invention claimed is:

1. An induced symbiotic osmosis pump (ISOP) comprising:
a plurality of closed loops comprising an initial closed loop, intermediate closed loops, and a final closed loop, each closed loop comprising a riser pipe having a given length and a downpipe having substantially the given length, the riser pipe receiving riser solution having a riser solute concentration at a base from an induced osmosis semipermeable membrane and communicating the riser solution at an opposed end to an in loop pump, the riser pipe being adapted to communicate the riser solution upward from the induced osmosis semipermeable membrane to a pressure exchanger, the pressure exchanger being adapted to communicate pressurized riser solution to an in loop reverse osmosis membrane, the in loop reverse osmosis membrane being adapted to produce an in loop reverse osmosis solution having a reduced solute concentration compared to the riser solution and to produce a remainder riser solution having an increased solute concentration compared to the riser solution, the in loop reverse osmosis membrane of the initial closed loop and the intermediate closed loops being adapted to communicate the in loop reverse osmosis solution to an additional closed loop, the plurality of closed loops being adapted to communicate the remainder riser solution back to the pressure exchanger, the pressure exchanger being adapted to communicate the remainder riser solution downward through the downpipe;
the downpipe comprising a check valve, wherein the initial closed loop receives desoluted source solution having an initial solute concentration from an initial reverse osmosis module receiving source solution having a source solute concentration from an initial pump adapted to pump the source solution from a source, wherein the in loop reverse osmosis membrane of the final closed loop communicates potable water to a storage tank; and,
wherein the source pump electronically communicates with an electrical source.

2. The ISOP of claim 1 wherein the electrical source comprises a wind turbine generator.

3. The ISOP of claim 2 wherein the wind turbine generator is at an elevated location relative to said base.

4. The ISOP of claim 1 wherein the source is seawater and the solute is salt.

5. The ISOP of claim 1 wherein the riser pipe comprises a riser pipe bore having a riser pipe diameter and the downpipe comprises a downpipe bore having a downpipe diameter, wherein the riser pipe diameter and the downpipe diameter are sized to minimize dynamic frictional pressure drop.

6. The ISOP of claim 1 wherein the riser pipe diameter is greater than the downpipe diameter.

* * * * *